(12) United States Patent
Mantel et al.

(10) Patent No.: US 10,382,445 B1
(45) Date of Patent: Aug. 13, 2019

(54) INTELLIGENT MESSAGING SYSTEM BASED TEMPORARY RECEIVER REGISTRATION FOR ELECTRONIC MESSAGE COMMUNICATIONS

(71) Applicant: Federal Reserve Bank of Chicago, Chicago, IL (US)

(72) Inventors: Brian Mantel, Naperville, IL (US); Ronald Gafron, Hoffman Estates, IL (US); Devin Cassidy, Alexandria, VA (US)

(73) Assignee: Federal Reserve Bank of Chicago, Chicago, IL (US)

( * ) Notice: Subject to any disclaimer, the term of this patent is extended or adjusted under 35 U.S.C. 154(b) by 324 days.

(21) Appl. No.: 15/152,075

(22) Filed: May 11, 2016

Related U.S. Application Data

(60) Provisional application No. 62/160,248, filed on May 12, 2015, provisional application No. 62/160,254, filed on May 12, 2015.

(51) Int. Cl.
*G06F 15/16* (2006.01)
*H04L 29/06* (2006.01)
(Continued)

(52) U.S. Cl.
CPC ......... *H04L 63/102* (2013.01); *G06Q 20/405* (2013.01); *H04L 51/12* (2013.01)

(58) Field of Classification Search
CPC ....... H04L 51/04; H04L 63/102; H04L 51/12; G06Q 20/405
See application file for complete search history.

(56) References Cited

U.S. PATENT DOCUMENTS 6,029,175 A * 2/2000 Chow .................... H04L 29/06
7,089,208 B1    8/2006 Levchin et al.
(Continued)

FOREIGN PATENT DOCUMENTS

WO     WO 03084175    * 10/2003    ............. H04L 29/06

OTHER PUBLICATIONS

Wikipedia Def. "instant messaging," (Apr. 30, 2014) www.wikipedia.com.*

(Continued)

*Primary Examiner* — Daniel S Felten
(74) *Attorney, Agent, or Firm* — King & Spalding

(57) ABSTRACT

An intelligent messaging server (herein 'messaging server') that is communicably coupled to trusted directory nodes receives, from a first user computing device, an electronic request that includes at least a unique identifier of a second user. Using the unique identifier, the messaging server determines that the second user is a registered user of the messaging server. Responsive to a negative determination that the second user is a registered user, the messaging server generates and transmits an electronic registration message to the second user. The electronic registration message includes a link to a secure web page that prompts the second user to temporarily register with the messaging server. Responsive to a temporary registration of the second user, the messaging server generates a record that includes at least an account identifier of the temporarily registered second user's account, providing enhanced security to the second user's data via the trusted directory nodes.

29 Claims, 30 Drawing Sheets

(51) Int. Cl.
*H04L 12/58* (2006.01)
*G06Q 20/40* (2012.01)

(56) References Cited

U.S. PATENT DOCUMENTS

| | | | |
|---|---|---|---|
| 7,979,348 B2 | 7/2011 | Thomas et al. | |
| 8,346,659 B1 | 1/2013 | Mohsenzadeh | |
| 8,352,463 B2 | 1/2013 | Nayak et al. | |
| 2002/0010608 A1* | 1/2002 | Faber | G06Q 10/0631 705/26.1 |
| 2003/0140103 A1* | 7/2003 | Szeto | H04L 51/04 709/206 |
| 2008/0147494 A1* | 6/2008 | Larson | G06Q 30/0234 705/14.34 |
| 2009/0287564 A1* | 11/2009 | Bishop | G06Q 20/02 705/14.38 |
| 2012/0095810 A1* | 4/2012 | Miao | G07C 13/00 705/12 |
| 2013/0238489 A1 | 9/2013 | Bouey et al. | |
| 2015/0046319 A1 | 2/2015 | Thomas et al. | |
| 2015/0088740 A1 | 3/2015 | Doyle et al. | |
| 2015/0106246 A1 | 4/2015 | Krishna | |
| 2015/0112866 A1 | 4/2015 | Muthu et al. | |
| 2015/0127527 A1 | 5/2015 | Eide | |
| 2015/0199670 A1 | 7/2015 | Dheer et al. | |

OTHER PUBLICATIONS

NACHA Payment Messaging Hub; NACHA—The Electronic Payment Association; Nov. 9, 2012.

Wiley, G. et al., "Using DANE to associate payment information with email addresses," Network Working Group, Internet Draft, Feb. 27, 2015.

Mockapetris, P. "Domain names—Implementation and Specification," Network Working Group, Nov. 1987.

* cited by examiner

INTELLIGENT MESSAGING SYSTEM BASED TEMPORARY RECEIVER REGISTRATION FOR ELECTRONIC MESSAGE COMMUNICATIONS

CROSS REFERENCE TO RELATED APPLICATIONS

This application claims priority to U.S. Provisional Application No. 62/160,254 filed on May 12, 2015 in the name of Brian Mantel, Ronald Gafron, and Devin Cassidy; and U.S. Provisional Application No. 62/160,248 filed on May 12, 2015 in the name of Brian Mantel, Ronald Gafron, and Devin Cassidy, the entire contents of each application being incorporated herein by reference.

Further, this application relates to a concurrently filed U.S. utility patent application entitled "Intelligent Messaging System based Multiple Account Selection for Electronic Message Communications," in the name of Brian Mantel, Ronald Gafron, and Devin Cassidy, which is hereby incorporated herein by reference.

TECHNICAL FIELD

This disclosure relates generally to secure communication between computing systems in an open network, and more particularly to technologies for an intelligent messaging system-based temporary registration of a receiving party in support of electronic message communications.

BACKGROUND

Electronic messaging systems may be used by one or more parties (involved parties) to communicate with each other or to enable electronic message communications with each other. Existing electronic messaging systems require the involved parties to share personal and critical information with each other over an open network to complete an activity. However, with the recent increase in identity theft, the involved parties may not desire to share such personal and critical information to avoid potential risk of their personal and critical data being stolen or misused.

Further, existing messaging systems are proprietary in nature and are accordingly, limited to providing services to users that exist within the closed environment of the respective proprietary systems. That is, existing electronic messaging systems may not be interoperable with each other, may not have information from users being maintained and protected or secures as would be preferable, and may not provide services to users that are outside the closed environment of the respective proprietary systems. This limits the number, quality, and/or type of services that existing electronic messaging systems can provide to their users because of their closed nature. For example, conventional electronic messaging systems may not provide a service that connects multiple accounts of a user, where the multiple accounts may be associated with one account handling/provider entity or associated with multiple distinct account handling/provider entities. Consequently, when the user having multiple accounts receives a service, the user may not be able to choose the account that the user wants to associate with the received service, thereby limiting account handling flexibility. Furthermore, if a user of a proprietary electronic messaging system has multiple accounts, the user may have to create multiple profiles, e.g., one profile for each account, and consequently may have to remember and manage the multiple profiles which may be inconvenient.

Additionally, in said proprietary electronic messaging systems, the user may not have the option to send a message to and complete an activity with a user that is not registered with the electronic messaging system until the user fully registers with said electronic messaging system. Such limitations of above mentioned conventional electronic messaging systems may prove to be limiting and inconvenient to the involved parties. Therefore, there is a need for a technology that overcomes the above-mentioned deficiencies.

SUMMARY

The present disclosure provides a system, method, and/or apparatus that addresses the above-mentioned deficiencies of the existing electronic messaging systems using one or more specialized computing systems. In particular, the present disclosure provides an intelligent electronic messaging communications system, also referred to as an electronic messaging system, that provides a technical solution for secure communications in electronic messaging systems. A communications session can be established between two or more computing systems via an open computing network in response to an electronically initiated/created request. The session may include electronic communication sessions and/or electronic message sessions between involved parties for a selected activity.

Further, the intelligent messaging system provides a technical solution to other problems of existing electronic messaging systems, such as: (i) an inability of existing electronic messaging systems to manage and/or connect/link multiple accounts of a user that is distributed across multiple distinct computing databases of one entity and/or of multiple distinct entities that provide, manage, maintain the accounts, and (ii) an inability of existing electronic messaging systems to provide a mechanism for a user of the electronic messaging system to establish a session with unregistered users.

The intelligent messaging system includes an intelligent messaging server that is communicatively coupled to a first computing device associated with a first user and a second computing device associated with a second user via a distributed computing network. Further, the intelligent messaging server is communicatively coupled to a plurality of directory databases that include account information associated with users of one or more entities that provide, manage, and maintain the accounts.

Responsive to a first user opting to initiate an electronic session with a second user, the intelligent messaging server receives an electronic request from the first computing device. In particular, the electronic request includes at least a unique identifier of the second user. Additionally, in some embodiments, the electronic request may include a parameter, such as an activity or task value. Upon receiving the electronic request, the intelligent messaging server determines whether the second user is a registered user of the intelligent messaging server based on the unique identifier of the second user. In particular, the intelligent messaging server queries a routing table of the intelligent messaging server to determine whether the unique identifier of the second user matches the unique identifier of a registered user recorded in the routing table.

The routing table may be a data table that includes data entries for each user (e.g., user of one or more entities that provides, manages, and maintains accounts of the user) that is registered with the intelligent messaging server to receive services offered by the intelligent messaging system (hereinafter 'registered user'). Each data entry in the routing table may include at least (i) a unique identifier of a respective registered user, and (ii) location information of directory databases that include account information of the respective registered user's accounts.

If the second user is not a registered user of the intelligent messaging server, i.e., responsive to a negative determination that the unique identifier of the second user is present in the routing table, the intelligent messaging server generates and transmits an electronic registration message to the second user based on the unique identifier of the second user. The second user may access the electronic registration message via the second computing device, and the electronic registration message may include a selectable pointer, such as a hyperlink that directs the second user to a secure web document that prompts the second user to provide temporary registration information required for temporary registration of the second user with the intelligent messaging server. In certain example embodiments, the temporary registration information may include the bare minimum information that is needed to process the electronic request. However, in other example embodiments, the temporary registration information may include additional information, such as name on the account, status of the account, contact information of the second user, and so on without departing from a broader scope of the present disclosure.

Once the second user provides the temporary registration information, the second computing device transmits the temporary registration information to the intelligent messaging server. Further, the intelligent messaging server stores the temporary registration information in a temporary registration database that is distinct from the directory database. In particular, the temporary registration database maintains information associated with users (i) that are not included in the routing table, and (ii) that are registered to receive one or more services offered by the intelligent messaging server for a temporary time period. For example, temporary registration may include a "one-time" registration that allows the second user to use the services of the intelligent messaging system for one session. Accordingly, the temporary registration information of the second user may be removed from the temporary registration database after each use and the second user will have to enter the temporary registration information each time the second user receives a session request from the first user. However, in other examples, the temporary registration may include a limited, but more than one time use of the services of the intelligent messaging system. The time period for which the second user is registered or may use the services of the intelligent messaging system may be controlled either by the second user or the entity associated with the second user's account (e.g., entity that provides, manages, and maintains the second user's account).

Responsive to storing the temporary registration information of the second user in the temporary registration database, the intelligent messaging server generates an electronic record that includes at least an account identifier of the second user's account (received from the temporary registration information) and an account identifier of the first user's account. Further, the electronic record is added to the message file which is transmitted to an activity completion network and/or an entity associated with the first user's account either periodically as batch data or as and when each electronic record is generated. The activity completion network may be configured to complete the selected activity that is initiated by the intelligent messaging server. Furthermore, the intelligent messaging server may store information associated with each request in an activity log for further analysis and logistics purposes.

Further, responsive to generating the electronic record, creating the message file, and/or updating the activity log, the intelligent messaging server may generate and transmit electronic confirmation messages to the first user and/or the second user regarding successful creation of a pending electronic record.

The intelligent messaging system of the present disclosure facilitates an electronic session between a first user and a second user where critical information of the second user is never exposed to the first user and vice-versa. Further, the intelligent messaging system allows unregistered users to establish electronic sessions, e.g., an electronic transaction, with registered users of the intelligent messaging system by temporarily registering the unregistered users with the intelligent messaging system. Prior closed-network electronic messaging systems may force an unregistered user to fully register with the proprietary electronic messaging system to obtain services of these systems. Furthermore, in some example embodiments, the intelligent messaging system of the present disclosure allows a second user to select one account of the second user's choice from multiple accounts of the second user to establish an electronic session with the first user. That is, the intelligent messaging system connects accounts distributed within the same directory database or across multiple directory databases and provides the second user the ability to select one of the multiple accounts to establish the electronic session. Whereas in prior closed-network electronic messaging systems, the payee may only be allowed to establish electronic sessions with accounts of the prior system's choice.

One example environment where the intelligent messaging system of the present disclosure may be used is a workflow-focused field, where the first user is a initiator, the first computing device is an initiator computing device, the second user is an approver, the second computing device is an approver computing device, and the electronic session is an electronic message approval request. For example, the intelligent messaging system may be used by the initiator to initiate electronic message approval request with an approver. In particular, the intelligent messaging server may receive an electronic message approval request from the initiator computing device. The electronic message approval request includes a unique identifier of the approver (herein 'approver identifier'). The intelligent messaging server may compare the approver identifier against a routing table to determine if the approver is a registered user, i.e., whether the approver identifier is present in the routing table. Upon determining that the approver is an unregistered user, the intelligent messaging server generates and transmits an electronic registration message to the approver using the approver identifier, where the electronic registration message is accessed through the approver computing device. The electronic registration message prompts the approver to provide temporary registration information required for temporary registration of the approver with the intelligent messaging server. Responsive to receiving the temporary registration information of the approver, the intelligent messaging system may store the temporary registration information in the temporary registration database that is distinct from the directory databases that include account information of one or more entity's users. Further, the intelligent messaging server generates an electronic approval request record comprising at least an identifier of the initiator's approval account, the account identifier of the approver's approval account provided in the temporary registration information.

Once the electronic approval request record is generated, the intelligent messaging server may generate and transmit confirmation messages to the initiator and/or the approver indicating successful creation of the electronic approval request record. Furthermore, the intelligent messaging server may transmit the electronic approval request record to a workflow approval network (either periodically or as batch data).

These and other aspects, features, and embodiments of the disclosure will become apparent to a person of ordinary skill in the art upon consideration of the following brief description of the figures and detailed description of illustrated embodiments.

BRIEF DESCRIPTION OF THE FIGURES

Reference will now be made to the accompanying drawings, which are not necessarily drawn to scale, and wherein.

Figure 1:
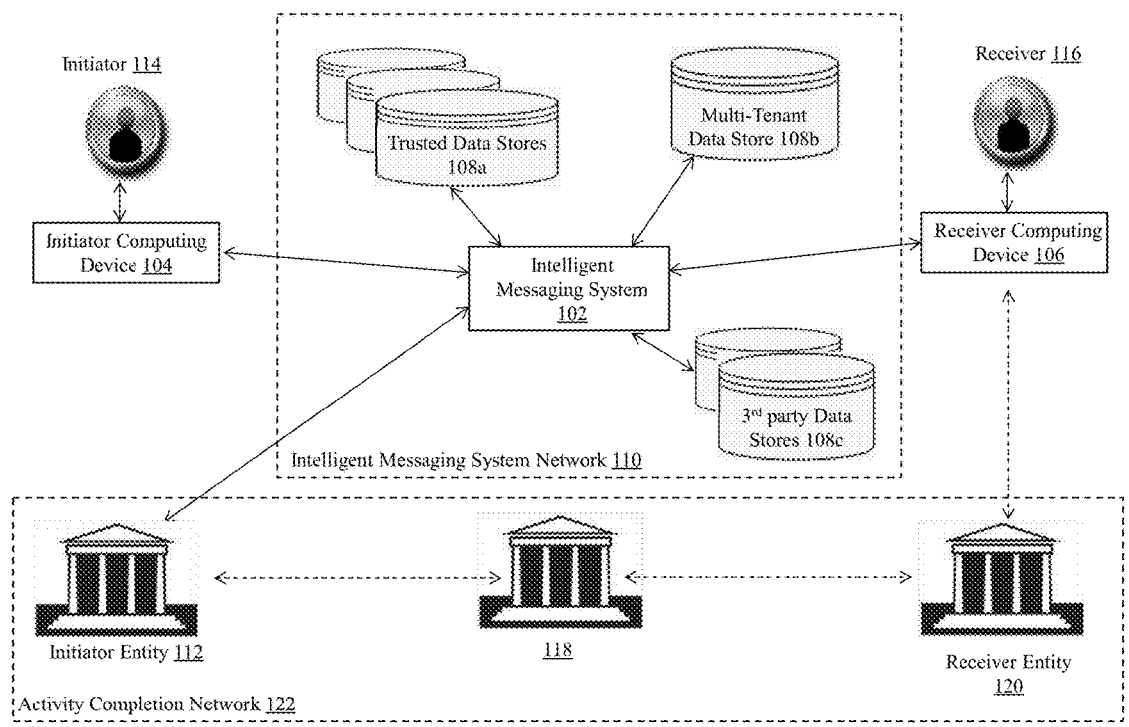
FIG. 1 illustrates an intelligent messaging system for electronic message communications between a first user and a second user, in accordance with example embodiments of the present disclosure.

The drawings illustrate only example embodiments of the invention and are therefore not to be considered limiting of its scope, as the invention may admit to other equally effective embodiments. In the drawings, reference numerals designate like or corresponding, but not necessarily identical, elements.

DETAILED DESCRIPTION OF EXAMPLE EMBODIMENTS

In the following paragraphs, a system, apparatus, and method for secure electronic messaging and communications between a first user and a second user will be described in further detail by way of examples with reference to the attached drawings. In the description, well known components, methods, and/or processing techniques are omitted or briefly described so as not to obscure the disclosure. Further, as used herein, the "present disclosure" refers to any one of the embodiments of the disclosure described herein and any equivalents. Furthermore, reference to various feature(s) of the "present disclosure" is not to suggest that all embodiments must include the referenced feature(s) or that all embodiments are limited to the referenced feature(s).

The intelligent messaging system of the present disclosure includes an intelligent messaging server that is configured to facilitate a secure electronic session between a first user and a second user via their respective computing devices, i.e., a first computing device and a second computing device, respectively over an open network. The intelligent messaging system of the present disclosure differs from existing electronic messaging systems in that: (i) the intelligent messaging system of the present disclosure provides an improved account handling feature that links multiple accounts of the second user that is associated with one entity or distributed across different distinct entities, (ii) the intelligent messaging system of the present disclosure allows the second user to select an account of the second user's choice from the multiple accounts, where the selected account is the one that the second user desires to use for establishing the electronic session (e.g., electronic communication or other electronic activities), and (iii) the intelligent messaging system of the present disclosure allows the first user to establish an electronic session with a second user who is unregistered with the intelligent messaging system.

In particular, the intelligent messaging server receives an electronic request from the first computing device to initiate an electronic session between the first user and the second user via their respective computing devices. The electronic request includes at least a unique identifier of the second user (herein 'second user identifier'). Responsive to receiving the electronic request, the intelligent messaging server may determine whether the second user is a registered user of the intelligent messaging server by comparing the second user identifier against a routing table of the intelligent messaging server. The routing table generally includes identifiers of registered users, where each registered user identifier is linked to location identifiers of one or more directory databases that includes account information of the registered users.

Upon determining that the second user is a registered user, the intelligent messaging server determines whether the second user has multiple accounts based on the location identifiers one or more directory databases that are linked to the second user identifier in the routing table. Provided the second user has multiple accounts, the intelligent messaging server generates and electronically transmits an electronic selection message to the second user based on the second user identifier, where the electronic selection message lists the multiple accounts and prompts the second user to select one of the multiple accounts to establish the electronic session. Responsive to receiving a selection of the second user from the second computing device, the intelligent messaging server generates an electronic record that includes at least an account identifier of the account selected by the second user and an account identifier of the first user's account. Further, the intelligent messaging server may send confirmation messages to the first user and/or the second user indicating a successful creation of the electronic record. In some embodiments, the account selection may be made by the intelligent messaging server based on a preference of the second user that is set or is provided during a registration process prior to the electronic communications session where the second user registers with the intelligent messaging server.

Upon determining that the second user is an unregistered user, the intelligent messaging server generates and electronically transmits an electronic registration message to the second user based on the second user's identifier. The second user may access the electronic registration message via the second computing device, where the electronic registration message prompts the second user to provide temporary registration information for temporary registration of the second user with the intelligent messaging server. Responsive to receiving the temporary registration information from the second computing device, the intelligent messaging server stores the temporary registration information of the second user in a temporary registration database and allows the first user to establish a session with the second user for a temporary time period. In particular, responsive to receiving the temporary registration information, the intelligent messaging server generates an electronic record including an account identifier of the second user's account (received from the temporary registration information) and an account identifier of the first user's account, providing enhanced security and control to the second user. Further, the intelligent messaging server may send confirmation messages to the first user and/or the second user indicating a successful creation of the electronic record.

The intelligent messaging system will be further described in greater detail below in association with one example embodiment where the intelligent messaging server is used in a transaction-focused field to allow an initiator to initiate an electronic payment transaction with a receiver. However, before discussing the example embodiment directed to the system, apparatus, and method for secure electronic payment transaction, multiple account selection, and temporary receiver registration, it may assist the reader to understand the various terms used herein by way of a general description of the terms in the following paragraphs.

The term 'transaction' as used herein may generally refer to a communicative action or activity involving two parties or things that reciprocally affect or influence each other. Example of transactions may include, but are not limited to, financial transactions, payment transactions, chat message transactions, etc.

The term 'open network' as used herein may generally refer to a public or unrestricted network. The open network may be unsecure and can be accessed by anyone. An example of an open network may include, but is not limited to, the Internet.

The term 'initiator' as used herein may generally refer to an individual or an organizational entity (e.g., a business) that initiates a communication. For an example environment, the initiator is a payer for a communication activity involving a financial transaction, such as an electronic payment. Hereinafter, the term 'initiator,' may be may interchangeably be referred to as 'sender,' or 'payer.'

The term 'receiver' as used herein may generally refer to an individual or an organizational entity (e.g., a business) that receives a communication. For an example environment, the receiver is a payee for a communication activity involving a financial transaction, such as an electronic payment. Hereinafter, the term 'receiver,' may be may interchangeably be referred to as 'payee,' 'recipient,' or 'beneficiary.'

The term 'payment account' as used herein may generally refer to any appropriate financial account to which a payment may be credited, or from which a payment may be debited. Example payment accounts may include, but are not limited to savings accounts, checking accounts, lines of credit, investment accounts, microloan accounts, insurance firm accounts, etc. In some embodiments, the payment account may be associated with financial institutions, such as banks, whereas in other embodiments, the payment account may be associated with any other financial service providers that provide financial products to account holders, such as non-bank financial institutions, electronic payment transfer service providers, and so on.

The term 'payment account information' as used herein may include any appropriate data associated with the payment account of a user. The payment account information may include both (a) critical information (private information), such as social security number, payment account number, etc., that may be limitedly shared with authorized and trusted parties, and (b) non-critical information (public information), such as e-mail address, phone number, etc., that may be shared more openly without a lot of restrictions. For example, the payment account information may include data associated with the user (individual and/or entity) and his/her payment account, such as name of the user, contact address of the user, e-mail address, phone number, location of business, subsidiaries of the business, merchant id, customer id, social security number, status of the payment account, transaction limits on the payment account, payment account identifiers, such as payment account number, etc.

The term 'unique identifier of user' as used herein may generally refer to any appropriate identifier that uniquely identifies a user. That is, a unique identifier of a receiver may uniquely identify a receiver and the unique identifier of the initiator may uniquely identify the initiator. In one embodiment, the unique identifier of the user may be a public identifier that may also be used to electronically communicate with or send electronic messages to the user, such as an e-mail address, a phone number, messenger handle, a social networking username, etc. Alternatively, the unique identifier may be an identifier that uniquely identifies a user, but is non-routable, i.e., cannot be directly used to electronically communicate with or send electronic messages to the user. In another embodiment, the unique identifier may be a modified version of the original public identifier, such as a pseudo e-mail address that is formed by adding specific text or characters in front of, after, or in between the email address, or a pseudo phone number that is formed by reversing the digits of the original phone number, etc. In yet another embodiment, the unique identifier may be either a user-generated identifier or an identifier generated by the intelligent messaging server, such as a random number, hash of an original public identifier, etc.

The term 'directory database' as used herein may generally refer to any appropriate data repository that stores payment account information associated with one or more users. The users may be customers of a financial institution and/or financial service provider where they hold one or more payment accounts. Accordingly, the payment account information in the directory database may be furnished by the respective financial institutions and/or financial service providers.

The term 'temporary registration' as used herein may generally refer a limited time period registration that enables a non-registered user to avail services of a system for the limited time period. The limited time period may include one-time use of the system or a limited, but more than one-time use of the system. In certain example embodiments, the temporary registration may also restrict the type and number of services of the intelligent messaging server that are available to the user.

The term 'temporary registration database' as used herein may generally refer to any appropriate data repository that stores information regarding temporary registered users. In the present disclosure, the temporary registration database may be distinct from the directory database and/or the routing table.

The term 'payment network' as used herein may generally refer to any appropriate financial entity and/or payment channel that handles a clearing and settlement process associated with a payment between two or more parties. The payment network as described herein may include clearing entities, which matches the initiator and receiver record, confirms that the counterparts agree to the terms, and reports discrepancies in case the reports do not match. Further the payment network may include settlement entities, which settle the payment delivery requirements between the corresponding financial institutions of the initiator and the receiver. The settlement agencies debit the payment amount from a payment account of the initiator and credit the receiver's payment account. The payment network may vary based on the payment type. For example, the payment network may include an ACH payment network, a wire transfer payment network, and so on. In some examples, in addition to the clearing and settlement banks, the payment network may include the initiator's bank and/or the receiver's bank that may communicate with the clearing and settlement banks to clear and settle a payment transaction.

The term 'financial institutions,' as used herein may generally refer to banks, and the term 'financial service providers,' as used herein may generally refer to any appropriate entity other than banks that provides financial services to one or more users. For example, the financial service provides can include, but are not limited to, credit-card companies, insurance companies, accountancy companies, consumer-finance companies, stock brokerages, investment funds and some government-sponsored enterprises.

Figure 3:
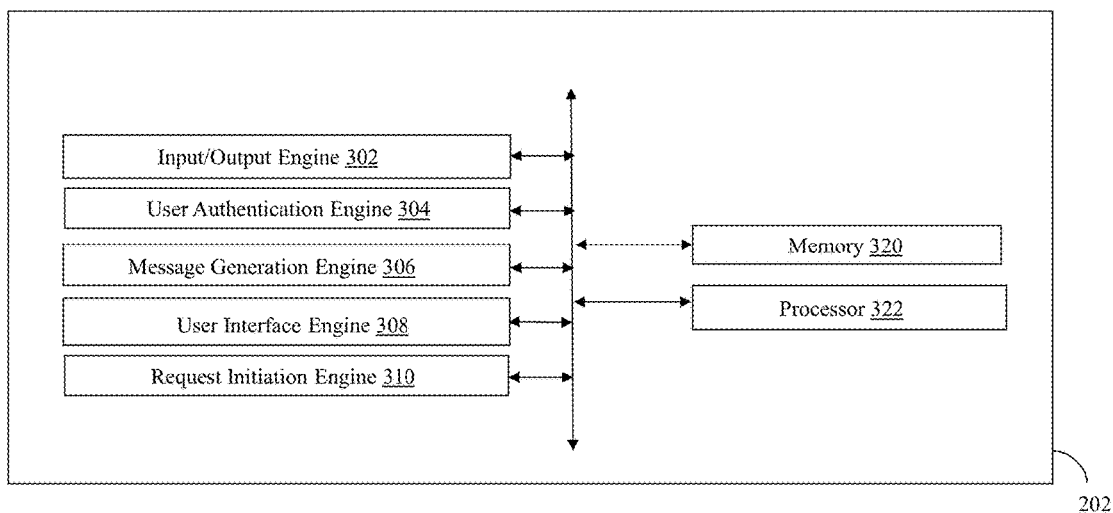
FIG. 3 illustrates a functional block diagram of the mobile application server of FIG. 2, in accordance with example embodiments of the present disclosure.
Figure 4:
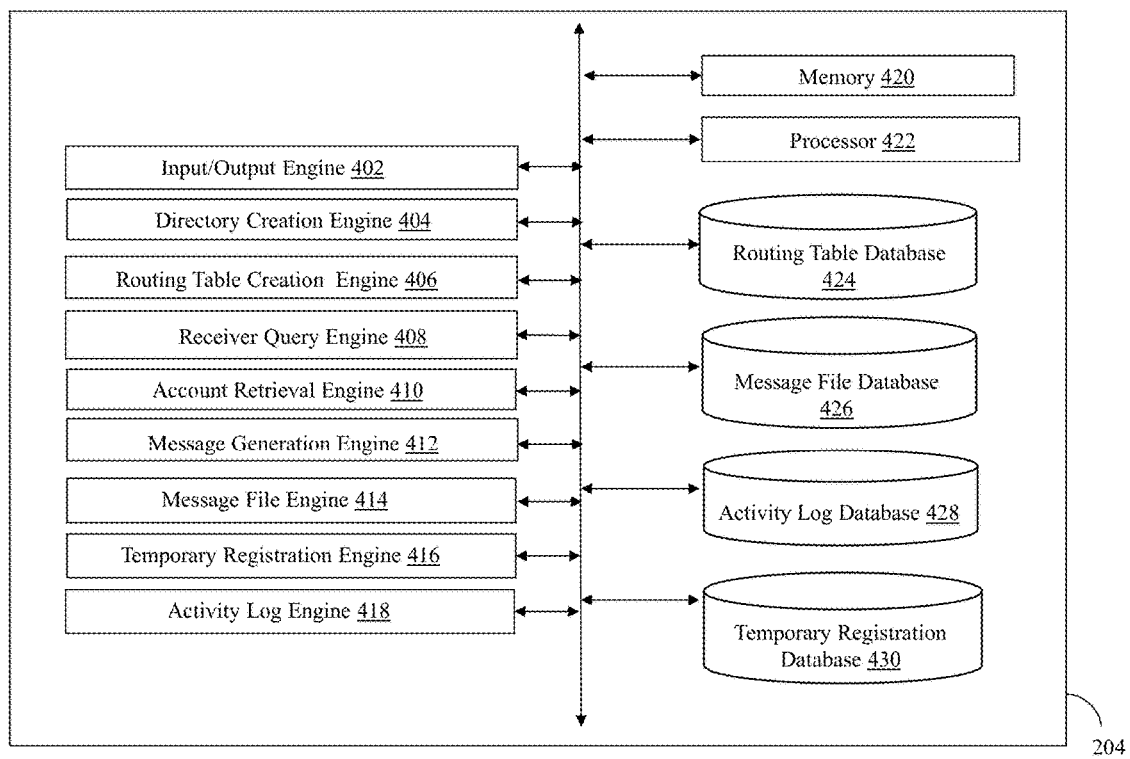
FIG. 4 illustrates a functional block diagram of the intelligent messaging server of FIG. 2, in accordance with example embodiments of the present disclosure.

Technology associated with the system, apparatus, and method for secure electronic payment transaction and multiple accounts selection will now be described in greater detail with reference to FIGS. 1-8, which describe representative embodiments of the intelligent messaging system. First, FIGS. 1-2 will be discussed in the context of describing a representative operating environment associated with the intelligent messaging system according to certain exemplary embodiments of the present invention. FIGS. 3 and 4 will be discussed, making exemplary reference back to FIGS. 1-2 as may be appropriate or helpful. Further, FIGS. 5-8 will be discussed, making exemplary reference back to FIGS. 1-4 and exemplary forward reference to FIGS. 9-10 as may be appropriate or helpful.

It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

I. System Architecture

Figure 2A:
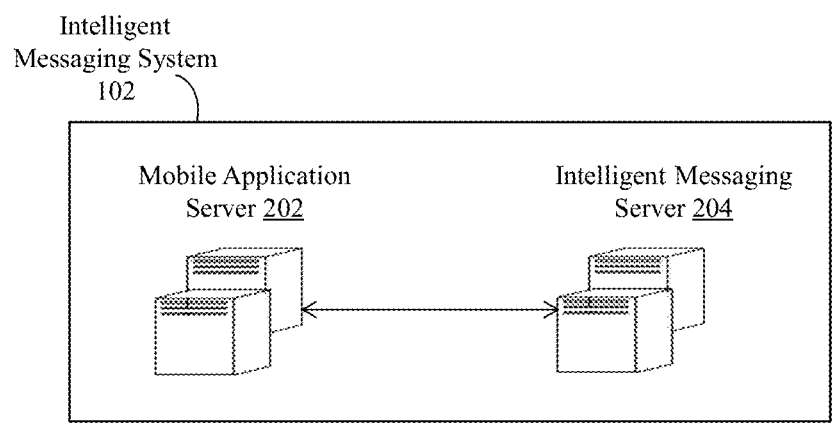
FIGS. 2A-2B (collectively 'FIG. 2') illustrate different example embodiments of the intelligent messaging system of FIG. 1, in accordance with example embodiments of the present disclosure.
Figure 2B:
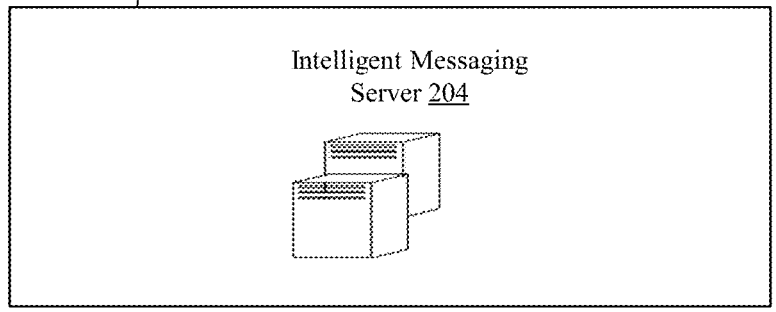

Turning to FIGS. 1-2, FIG. 1 illustrates an example operating environment of an intelligent messaging system in accordance with an example embodiment; and FIGS. 2A-2B (collectively 'FIG. 2') illustrate different example embodiments of the intelligent messaging system of FIG. 1, in accordance with example embodiments of the present disclosure.

As illustrated in FIG. 1, the example operating environment 100 may include an intelligent messaging system network 110. In particular, the intelligent messaging system network 110 may include one or more trusted directory databases 108*a*, a multi-tenant directory database 108*b*, one or more third party directory databases 108*c*, and/or the intelligent messaging system 102 that are communicatively coupled to each other via a wired or wireless computing network such as, but not limited to, Internet, Cellular network, Wi-Fi, Wi-Max, other proprietary banking networks, and so on. In certain example embodiments, the intelligent messaging system 102 and the different directory databases 108*a-c* may be implemented using a cloud computing architecture that enables an ubiquitous, on-demand access of resources and services offered by intelligent messaging system 102 and/or the different directory databases 108*a-c*. However, in other example embodiments, the intelligent messaging system 102 and the different directory databases 108*a-c* may be implemented using any other appropriate computing architecture without departing from a broader scope of the present disclosure.

In particular, the intelligent messaging system 102 may interact with the different directory databases 108*a-c* to facilitate a payment transaction from initiator 114 to a receiver 116 without either party disclosing any critical payment account information to each other. In certain example embodiments, the initiator 114 and the receiver 116 may both be individual users, while in other example embodiments, the initiator 114 and the receiver 116 may both be business entities. In yet another example embodiment, the initiator 114 may be an individual user, such as a customer, and the receiver 116 may be a business entity, such as a merchant or vice-versa. In other words, the intelligent messaging system 102 caters to various payment transaction scenarios including, but not limited to, individual to individual payment transactions, individual to business entity transactions (e.g., bill pay transactions, customer-vendor transactions, etc.), business entity to individual payment transactions, and/or business to business payment transactions.

i. Trusted Directory Database

The trusted directory databases 108*a* (hereinafter 'trusted directory 108*a*') may include one or more data repositories, each data repository associated with a specific trusted directory database provider and storing payment account information of the respective trusted directory database provider's customers (account holder). For example, the initiator 114 may be customer of the initiator bank 112 and may hold a payment account with the initiator bank 112. Accordingly, a trusted directory 108*a* associated with the initiator bank 112 (hereinafter 'initiator bank directory') may include the payment account information associated with the initiator's 114 payment account. Similarly, the receiver 116 may be a customer of the receiver bank 120 and may hold a payment account with the receiver bank 120. Accordingly, the receiver bank 120 may have a trusted directory 108*a* (hereinafter 'receiver bank directory') that stores payment account information associated with the receiver's 116 payment account.

Even though the above example describes the receiver bank directory and the initiator bank directory as having payment account information of the receiver's payment account and the initiator's payment account, respectively, one of ordinary skill in the art can understand and appreciate that the receiver bank directory and the initiator bank directory may include payment account information of numerous other customers without departing from a broader scope of the present disclosure. Further, even though the above example describes each trusted directory database provider as having one trusted directory 108a, one of ordinary skill in the art can understand and appreciate the each trusted directory database provider can have a set of trusted directories and the payment account information of the respective trusted directory database provider's customers may be distributed across the set of trusted directories of the respective trusted directory database provider without departing from a broader scope of the present disclosure.

In certain example embodiments, a user may have multiple payment accounts within the same trusted directory database provider or across multiple distinct trusted directory database providers. For example, the initiator 114 and/or the receiver 116 may have multiple payment accounts within one bank or across different distinct banks, and payment account information associated with each payment account may be stored in a trusted directory 108a associated with the trusted directory database provider that holds the respective payment account. In said example, the receiver 116 may have two payment accounts with financial institution A, and one payment account with financial institution B. Accordingly, the payment account information associated with the two financial institution A payment accounts may be stored in one or more trusted directories 108a of the financial institution A, while the payment account information associated with the financial institution B payment account may be stored in trusted directories 108a of the financial institution B.

In other words, a trusted directory 108a of one trusted directory database provider may not include payment account information of another trusted directory database provider's customers, unless the other trusted directory database provider is a branch of or subsidiary of the one trusted directory database provider. Further, data in each trusted directory 108a is furnished, maintained, and administered by the trusted directory database provider associated with the respective trusted directory 108a. That is, a trusted directory database provider associated with a trusted directory maintains and controls the sharing of payment account information stored in the trusted directory database.

In one example, the trusted directory database provider may be a financial institution.

ii. Third Party Directory Database

The third party directory databases 108c (hereinafter 'third party directory 108c') may include one or more data repositories, each data repository associated with a specific third party directory database provider and storing payment account information of the respective third party directory database provider's customers.

Instead of or in addition to being a customer of a trusted directory database provider, a user may be a customer of one or more third party directory database providers. In one example, the third party directory database providers may be financial service providers and in said example the initiator 114 and/or receiver 116 may be customers of one or more financial service providers, such as PayPal®, Western Union®, etc. Each third party directory database provider (hereinafter 'third party directory provider') may store payment account information of its customers in one or more third party directories 108c associated with the respective third party directory provider. In said example, payment account information of the initiator 114 and/or receiver 116 may be stored in third party directories 108c associated with PayPal® and Western Union®, provided the initiator 114 and/or receiver 116 are customers of PayPal® and Western Union®, respectively.

Similar to trusted directories 108a, the third party directories 108c of one third party directory provider may not include payment account information of another third party directory provider's customers. Further, data in each third party directory 108c is furnished, maintained, and administered by the third party directory provider associated with the respective third party directory 108c.

Even though the present disclosure describes that the trusted directories 108a and the third party directories 108c store/include payment account information of all the customers of the associated directory providers, one of ordinary skill in the art can understand and appreciate that in some embodiments, the trusted directories 108a and third party directories 108c may only include payment account information of selected customers that desire to receive services offered by the intelligent messaging system 102, thereby, protecting the privacy of the remaining customers. Such selected customers that desire to receive services offered by the intelligent messaging system 102 may be referred to hereinafter as 'registered users' or 'registered customers'. Alternatively, the trusted directories 108a and third party directories 108c may include payment account information of all the customers (registered and unregistered), but the payment account information of the registered customers may be flagged as data that is shareable with the intelligent messaging system 102, while the payment account information of the unregistered customers is hidden from the intelligent messaging system 102. Further, payment account information of any directory provider's customer/user may be shared with the intelligent messaging system 102 only based on express consent from the customer/user.

iii. Initial Set-Up/Registration Process

As described above, one or more customers (e.g., account holders) of a financial institution and/or a financial service provider (hereinafter financial institutions and financial service providers may both be interchangeably referred to as 'financial entities') may be interested in receiving one or more services offered by the intelligent messaging system 102. In order to receive services offered by the intelligent messaging system 102, the customers may register one or more of their payment accounts with the intelligent messaging system 102 prior to initiating an electronic payment transaction. However, in some example embodiments, a user may register with the intelligent messaging system after the initiation of the electronic payment transaction, for example, temporary registration of an unregistered receiver occurs after initiation of the electronic payment request by an initiator.

In certain example embodiments, the customers may register one or more of their payment accounts with the intelligent messaging system 102 via the respective financial entities that hold the customer's respective payment accounts. For example, the initiator 114 and/or the receiver 116 may register their payment accounts with the intelligent messaging system 102 through the initiator bank 112 and/or the receiver bank 120, respectively. That is, the initiator 114 and/or receiver 116 may inform the initiator bank 112 and/or receiver bank 120, respectively, that they want to receive services offered by the intelligent messaging system 102. Subsequently, the initiator bank 112 and/or the receiver bank 120 may register one or more payment accounts of the initiator's choice and/or the receiver's choice, respectively, with the intelligent messaging system 102.

Alternatively, a financial entity may automatically register all the payment accounts of a customer with the intelligent messaging system 102, unless specified otherwise by the customer. Further, in certain other example embodiments, the customers may directly register with the intelligent messaging system 102, e.g., in the case of temporary registration of the receiver 116.

As a part of the registration process, each financial entity and/or their respective directories (108*a,c*) may send a registration data file to the intelligent messaging system 102. In certain example embodiments, the registration data file may include (i) a unique identifier associated with each user that wants to receive the services offered by the intelligent messaging system 102, i.e., registered users, and (ii) a location information of the directories (108*a,c*) that includes the payment account information of each registered user. For example, the receiver bank 120 and/or a receiver bank directory 108*a* may provide a registration data file to the intelligent messaging system 102, where the registration data file includes, inter alia, a unique identifier of the receiver 116 (provided the receiver 116 wants to receive services offered by the intelligent messaging system 102) and an IP address of the receiver bank directory 108*a* that includes the payment account information of the receiver's payment account.

In certain other example embodiments, the registration data file may not include the location information of the directories (108*a,c*) that include the payment account information of each registered user. Instead, the intelligent messaging system 102 may determine the location information of each directory database from a source address included in a header of the registration data file received from the respective directory database. That is, in said example embodiment, the registration data file may only include only the unique identifier associated with each registered customer. However, one of ordinary skill in the art can understand and appreciate that in other embodiments, the registration data file may include lesser or more information than described in the above example embodiments without departing from a broader scope of the present disclosure. For example, the registration data file may additionally include, a registered user's preference and/or a respective financial entity's preference regarding which payment account needs to be selected as a default payment account in case of a multiple payment account scenario, alias associated with each payment account to specifically identify the payment accounts in a directory, and so on. In certain example embodiments, the user may be informed not to provide a default payment account if the user may later wish to have an option of choosing a payment account from multiple payment accounts to receive a payment amount from an initiator.

Responsive to receiving the registration data file, the intelligent messaging system 102 may build a routing table by storing/adding the data from the registration data file to the routing table. In particular, the routing table may include the unique identifier of each registered user and the location information of the directories that include payment account information of the respective registered user's payment account.

In certain example embodiments, the unique identifier of the registered user that is included in the registration data file and/or stored in the routing table of the intelligent messaging system 102 may be chosen by the registered user. For example, the receiver 116 may instruct the receiver bank 120 that the receiver 116 wants the receiver's Gmail address to be used for registering the receiver's payment account with the intelligent messaging system 102. Accordingly, during registration, the receiver bank 120 and/or the receiver bank directory 108*a* includes the receiver's Gmail address in the registration data file to be used as the unique identifier of the receiver 116. However, in other example embodiments, the unique identifier of the registered user may be chosen by the registered user's financial entity. For example, if the receiver 116 does not provide express instructions, the receiver bank 120 may select the unique identifier of the receiver 116 from a list of public identifiers of the receiver, e.g., the receiver's phone number included in the payment account information.

In certain example embodiments where a user has multiple payment accounts associated with the same financial entity or across multiple distinct financial entities, the user may choose to register one or more of the multiple payment accounts with the intelligent messaging system 102. For example, the receiver 116 may have four payment accounts and may choose to register three of the four payment accounts with the intelligent messaging system 102. Continuing with the example, the receiver 116 may instruct the corresponding financial entities associated with the three payment accounts to consistently use the same unique identifier for registering the payment accounts with the intelligent messaging system 102. For example, the receiver 116 may instruct the financial entities associated with the three payment accounts to use the receiver's Gmail address for registration of each of the three payment accounts.

The use of the same unique identifier consistently across the multiple payment accounts associated with the same financial entity or multiple distinct financial entities may enable the intelligent messaging system 102 to connect/link the multiple payment accounts to one customer. That is, the payment account information of the registered user's multiple payment accounts that are distributed across multiple distinct directories 108*a-c* may be linked together by the intelligent messaging system 102 based on the unique identifier of the registered user that is consistently used for registration of the multiple payment accounts. Said ability allows the intelligent messaging system 102 to provide certain features to the customer, such as allow the customer to select among the multiple payment accounts within one financial entity or across multiple distinct financial entities to send and/or receive payments. Thus, the intelligent messaging system 102 of the present disclosure improves over the existing electronic payment systems discussed in the background and/or summary section of the present disclosure.

In certain other example embodiments, multiple unique identifiers may be used to register multiple payment accounts of the same customer. In said example embodiment where multiple unique identifiers are used, the intelligent messaging server 102 may provide the customer with an option to link and/or manage the multiple payment accounts at the customer's end. For example, a receiver 116 has one payment account with financial institution A, one payment account with financial institution C, and one payment account with financial institution D. In said example, the receiver 116 chooses to register all three payment accounts with the intelligent messaging system 102. In particular, a Gmail address of the receiver 116 may be used as the unique identifier for registration of the financial institution A payment account, a phone number of the receiver 116 may be used as the unique identifier for registration of the financial institution C payment account, and messenger chat handle may be used as the unique identifier for registration of the financial institution D payment account. Accordingly, the intelligent messaging system 102 may not automatically recognize the financial institution A payment account, financial institution C payment account, and the financial institution D payment account as being associated with the same receiver 116. However, at the time of registration, the intelligent messaging system 102 may provide the receiver 116 the ability to identify and link the financial institution A payment account, financial institution C payment account, and the financial institution D payment accounts together through an intelligent messaging application of the intelligent messaging system. Further, said linking information may be sent to the intelligent messaging system 102 which then identifies and internally associates the financial institution A payment account, financial institution C payment account, and the financial institution D payment account as being related to the same receiver 116.

iv. Multi-Tenant Directory Database

Referring back to the registration process, in addition to providing the registration data file to the intelligent messaging system 102 to create the routing table, some of the financial entities may request the intelligent messaging system 102 to store, maintain, and administer the payment account information of the financial entities' customers (customers interested in receiving services of the intelligent messaging system 102). Accordingly, the directories (108a, c) associated with said financial entities may send a payment account data file to the intelligent messaging system 102. The payment account data file may include payment account information of the payment accounts of the financial entities' customers stored in the respective directories (108a,c). Responsive to receiving the payment account data file, the intelligent messaging system 102 may extract, transform, and load the payment account information of the financial entities' customers into the multi-tenant directory database 108b (hereinafter 'multi-tenant directory 108b') of the intelligent messaging system 102.

Contrary to the trusted directories 108a and the third party directories 108c, the multi-tenant directory 108b may be configured to store payment account information of more than one financial entities' customers. Even though FIG. 1 illustrates the multi-tenant directory 108b as one data repository, one of ordinary skill in the art can understand and appreciate that the multi-tenant directory 108b may include more than one data repository. Further, the multi-tenant directory 108b and/or the data in the multi-tenant directory 108b is maintained and administered by the intelligent messaging system 102.

v. Initiator Computing Device and Receiver Computing Device

As illustrated in FIG. 1, the operating environment of the intelligent messaging system 102 may include an initiator computing device 104 associated with the initiator 114 and a receiver computing device 106 associated with the receiver 116. The initiator computing device 104 and the receiver computing device 104 may be communicatively coupled to the intelligent messaging system 102 via a wired and/or wireless communication network.

In certain example embodiments, the initiator computing device 104 and the receiver computing device 104 may include any appropriate portable or stationary computing devices. For example, the initiator computing device 104 and the receiver computing device 104 may include, but are not limited to, a desktop, a laptop computer, a tablet, a cellular phone, smart phone, a personal digital assistant, a portable gaming device, a pager device, an e-mail viewer device, or other suitable device. In another example, the initiator computing device 104 and the receiver computing device 104 may include a combination of one or more server computers, for example, if the initiator 114 and/or receiver 112 is a business entity.

The initiator 114 may use the initiator computing device 104 to interact with and access services offered by the intelligent messaging system 102 and/or the initiator bank 112, for example, to access online banking services offered by the initiator bank 112 and/or to initiate a payment transaction with a receiver through the intelligent messaging system 102. Accordingly, the initiator computing device 104 may include network interface features that allow the initiator computing device 104 to communicate with a computing system of the initiator bank 112 and/or the intelligent messaging system 102 via a computing network. Further, the initiator computing device 104 may include display features and/or input/output features configured to present one or more user-interface screens from the initiator bank 112 and/or the intelligent messaging system 102 to the initiator 114 and through which the initiator 114 may interact with and/or access services offered by the intelligent messaging system 102 and/or the initiator bank 112. For example, the initiator 114 may use the initiator computing device 104 to input user credentials for authentication of the initiator 114 with the initiator bank 112 and/or the intelligent messaging system 102. Further, the initiator 114 may use the initiator computing device 104 to input information required to create an electronic payment transaction request. Furthermore, the initiator 114 may use the initiator computing device 104 to receive confirmation messages regarding the payment transaction request. One of ordinary skill in the art can understand and appreciate that the example uses of the initiator computing device mentioned above are not limiting. That is, in other embodiments, the initiator computing device may be used for any other appropriate operations, such as communicating with other users, searching for a specific receiver, checking e-mails, accessing the Internet, etc., without departing from a broader scope of the present disclosure.

Similar to the initiator computing device 104, the receiver 116 may use the receiver computing device 106 to interact with and access services offered by the intelligent messaging system 102 and/or the receiver bank 120. Accordingly, the receiver computing device 106 may include network interface features, display features, and/or input/output features as described above in associated with the initiator computing device 104. In particular, the receiver 116 may use the receiver computing device 106 to receive messages from the receiver bank 120, the initiator bank 112, and/or the intelligent messaging system 102. Further, the receiver 116 may use the receiver computing device 106 to select a payment account from a list of multiple payment accounts for transfer of payments from an initiator 114. Furthermore, the receiver 116 may use the receiver computing device 106 to input information required to temporarily register the receiver 116 with the intelligent messaging system 102. Additionally, the receiver 116 may use the receiver computing device 106 to receive confirmation messages regarding the payment transaction request of the initiator 114. One of ordinary skill in the art can understand and appreciate that the example uses of the receiver computing device mentioned above are not limiting. That is, in other embodiments, the receiver computing device may be used for any other appropriate operations, such as communicating with other users, checking e-mails, accessing the Internet, etc., without departing from a broader scope of the present disclosure.

vi. Payment Network

As illustrated in FIG. 1, the operating environment of the intelligent messaging system 102 may include a payment network 122. The payment network 122 may include, inter alia, the initiator bank 112, a clearing bank 118, and/or a receiver bank 120, where computing systems of the respective banks are communicatively coupled to each other via a computing network. In particular, the payment network 122 may handle the clearing and settlement of payment transfers to a receiver 116 resulting from payment transaction request initiated by the initiator 114. One of ordinary skill in the art can understand and appreciate that, the payment network 122 may include any appropriate clearing and settlement network, such as ACH network, wire transfer network, etc., without departing from a broader scope of the present disclosure.

As illustrated in FIG. 1, the intelligent messaging system network 110 may be separate and distinct from the payment network 122 in that the intelligent messaging system network 112 does not handle the clearing and settlement of payments between the initiator 114 and the receiver 116. That is, the intelligent messaging system 102 may create pending payment request files (comprising one or more payment request records) and transmit them to the payment network 122. In particular, the intelligent messaging system 102 may transmit the payment request files to the initiator bank 112. Responsively, the initiator bank 112 forwards the payment request files to the clearing and settlement banks to clear and settle associated payment transactions by debiting a payment amount from the initiator's payment account at the initiator bank 112 and crediting the payment amount to receiver's payment account at the receiver bank 120. Further, once the payment amount has been credited to the receiver's payment account, the receiver bank 120 may inform the receiver 116 that the payment amount has been received.

vii. Intelligent Messaging System

As illustrated in FIG. 2A, the intelligent messaging system 102 may include a mobile application server 202 and an intelligent messaging server 204 that are communicatively coupled to each other. Alternatively, in certain example embodiments, the intelligent messaging system 102 may not include the mobile application server 202 as illustrated in FIG. 2B. In particular, in the example embodiment illustrated in FIG. 2B, the mobile application server 202 may be logically located within a computing system of the initiator bank 112 and may be administered by the initiator bank 112, whereas, in the example embodiment of FIG. 2A, the mobile application server 202 may be administered by an entity that administers the intelligent messaging server 204. In either case, all communications between the initiator/receiver computing devices (104,106) and the intelligent messaging server 204 may be sent through the mobile application server 202. That is, the mobile application server 202 may receive communications from the initiator computing device 104 and/or receiver computing device 106, analyze and/or process the communication, and forward the analyzed and/or processed communication to the intelligent messaging server 204. Further, all messages and/or communication sent from the intelligent messaging server 204 to the initiator computing device 104 and/or receiver computing device 106 may be sent through the mobile application server 202. However, in certain example embodiments, the intelligent messaging server 204 may communicate directly with the initiator computing device 104 and receiver computing device 106 without going through the mobile application server 202.

In particular, the initiator computing device 104 and/or the receiver computing device 106 may be configured to execute a client instance of the intelligent messaging system 102, such as an intelligent messaging application to access services offered by the intelligent messaging system 102. In certain example embodiments, the intelligent messaging application may be integrated with an online banking application of the initiator bank 112/receiver bank 120 and accordingly, the services offered by the intelligent messaging system 102 may be embedded/nested within the online banking application, such as an online banking web page of the initiator bank 112. However, in other example embodiments, the intelligent messaging application may be a standalone application.

In certain example embodiments, the initiator 114 may either download the intelligent messaging application to the initiator computing device 104 or the intelligent messaging system 102 may push the intelligent messaging application to the initiator computing device 104 during registration. In either case, when the initiator 114 executes the intelligent messaging application, the initiator computing device 104 generates an API call that invokes a client instance of the intelligent messaging system 102 in the initiator computing device 104. Further, the initiator 114 may be requested to enter login credentials of the initiator 114 to get authenticated. Once the initiator 114 is authenticated using the login credentials, the initiator 114 may be granted access to the various services offered by the intelligent messaging system 102, such as generating an electronic payment request to transfer payments to a receiver 116, perform a receiver lookup, etc. However, in other example embodiments where the intelligent messaging application is integrated with an online banking application of the initiator bank 112, a client instance of the intelligent messaging system 102 may be invoked by the online banking application of the initiator bank 112 when the initiator 114 access the online banking application. Further, the various services offered by the intelligent messaging system 102 may be presented to the initiator 114 through an online banking web page of the initiator bank 112, i.e., with a look and feel of the initiator bank 112.

The operation of the intelligent messaging system 102, i.e., the intelligent messaging server 204 and/or the mobile application server 202 will be described in greater detail in association with FIGS. 5-10, and a hardware implementation of the intelligent messaging server 204 and/or the mobile application server 202 will be described in greater detail below in association with FIGS. 3-4.

II. Mobile Application Server and Intelligent Messaging Server i. Mobile Application Server Turning to FIG. 3, this figure illustrates a block diagram of the mobile application server 202 of FIG. 2A, in accordance with an example embodiment. In particular, FIG. 3 illustrates an input/output engine 302, a user authentication engine 304, a message generation engine 306, a user interface engine 308, a request generation engine 310, a memory 320, and a processor 322.

Although FIG. 3 of the present disclosure illustrates engines 302-310 as being part of the mobile application server 202, one of ordinary skill in the art can understand and appreciate that the one or more of the engines 302-310 may be implemented as a separate standalone components that are external to and communicably coupled to the mobile application server 202. Further, the mobile application server 202 may be implemented using one or more data processing devices, either as a distributed server system where the operations of the mobile application server 202 may be distributed between one or more data processors or as a centralized server system where the operations of the mobile application server 202 may be handled by a single data processor.

As illustrated in FIG. 3, the mobile application server 202 may include a processor 322, where the processor 322 may be a multi-core processor or a combination of multiple single core processors. Further, the mobile application server 202 may include a memory 320 coupled to the processor 322. The memory 320 may be non-transitory storage medium, in one embodiment, and a transitory storage medium in another embodiment. The memory 320 may include instructions that may be executed by the processor 322 to perform operations of the mobile application server 202. In other words, operations associated with the different engines of the mobile application server 202 may be executed using the processor 322.

In particular, the mobile application server 202 may include an input/output engine 302 that is configured to enable communication to and from the mobile application server 202. The input/output engine 302 may receive input from the initiator computing device 104, the receiver computing device 106, and/or the initiator bank computing system. Example input received by the input/output engine 302 may include, but is not limited to, user login credentials from the initiator computing device 104, electronic payment request creation data from the initiator computing device 104, receiver/receiver lookup request data from the initiator computing device 104, receiver account selection data from the receiver computing device 106, and/or temporary registration data from the receiver computing device 106. In response to receiving the input, the mobile application server 202 may generate one or more outputs for transmission to the intelligent messaging server 204, the initiator computing device 104, the receiver computing device 106, and/or the initiator bank computing system. In particular, example outputs transmitted by the input/output engine 302 may include, but are not limited to, intelligent messaging server services menu to the initiator computing device 104, electronic payment request data file to the intelligent messaging server 204, user authentication query to the initiator bank computing system, confirmation messages to the initiator computing device 104 and/or the receiver computing device 106, electronic selection message to the receiver computing device 106, electronic registration message to the receiver computing device 106, and/or secure web documents to the receiver computing device 106. Further, in some example embodiments where one or more engines 302-310 of the mobile application server 202 are implemented as standalone components external to the mobile application server 202, the various inputs and outputs of the mobile application server 202 may also include data sent to and/or received from the one or more engines that are external to the mobile application server 202.

In one example embodiment, responsive to the initiator 114 accessing an intelligent messaging application and/or an initiator bank application on the initiator computing device 104, the input/output engine 302 may operate in concert with the user authentication engine 304 and/or the user-interface engine 308 to transmit a user authentication document, e.g., web page to the initiator computing device 104 for presentation to the initiator 114. The authentication web document may prompt the initiator 114 to input login credentials associated with the initiator 114.

In certain example embodiments where the intelligent messaging application is integrated with a banking application of the initiator bank 112, the login credentials of the initiator 114 may be the same as that of the initiator bank 112 login credentials of the initiator 114. For example, if the initiator 114 has an payment account with financial institution A and the services of the intelligent messaging system 102 are offered through financial institution A's online banking application, the initiator may login to financial institution A's online banking application using the initiator's financial institution A login credentials and subsequently access the services of the intelligent messaging system 102 through the financial institution A online banking application. However, in other example embodiments where the intelligent messaging application is a stand-alone application, the login credentials of the initiator 114 may be specific to the intelligent messaging system 102 that is either generated by the intelligent messaging system 102 or created by the initiator 114 while registering with the intelligent messaging system 102. In said example embodiment where the intelligent messaging application is a stand-alone application, the system created initiator credentials or user created credentials may be stored either in a memory (or database) of the intelligent messaging server 204 or the mobile application server 202.

In either case, responsive to the initiator 114 inputting the initiator's login credentials, the input/output engine 302 of the mobile application server 202 may receive and forward the initiator login credentials to the user authentication engine 304. Upon receiving the initiator login credentials, the user authentication engine 304 may generate and transmit an authentication query to either the initiator bank computing system or the intelligent messaging server 204. In particular, if the intelligent messaging application is integrated with a banking application of the initiator bank 112 as described above, the authentication query may be transmitted to the initiator bank computing system. Alternatively, if the intelligent messaging application is a stand-alone application offered by the intelligent messaging system 102, the authentication query may be transmitted to the intelligent messaging server 204 or a memory 320 of the mobile application server 202.

In response to the authentication query, the input/output engine 302 may receive initiator credential data from either the initiator bank computing system, the intelligent messaging server 204, or the memory 320 of the mobile application server 202. Upon receiving the initiator credential data, the user authentication engine 304 may compare the initiator credential data with the initiator login credentials inputted by the initiator 114. If the initiator credential data matches the initiator login credentials, the initiator 114 may be successfully authenticated. However, if the initiator credential data does not match the initiator login credentials, the initiator authentication fails.

Responsive to a failed authentication, the user authentication engine 304 may operate in concert with the message generation engine 306, the user-interface engine 308, and/or the input/output engine 302 to generate and transmit an error message to the initiator computing device 104. In addition, the user authentication engine 304 may re-transmit the user authentication document to the initiator computing device 104 prompting the initiator 114 re-enter the initiator login credentials.

However, if the initiator 114 is successfully authenticated, the user authentication engine 304 may operate in concert with the user-interface engine and/or the intelligent messaging server 204 to generate and transmit an intelligent messaging services menu document to the initiator computing device 104 for presentation to the initiator 114. In particular, the intelligent messaging services menu document may prompt the initiator to select a desired service. Once the initiator 114 has selected a desired service, the input/output engine 302 may receive a signal that identifies the type of service selected by the initiator 114.

Responsive to determining that the initiator 114 has selected an electronic payment transaction service, the input/output engine 302 may operate in concert with the request generation engine 310 and/or the user-interface engine 308 to generate and transmit a payment request form to the initiator computing device 104 for presentation to the initiator 114. The payment request form may prompt the initiator 114 to input information required to initiate the electronic payment transaction, such as, but not limited to, a payment amount, a unique identifier of the receiver, and/or a payment account of the initiator 114 from which the payment is to be transferred.

In response to transmitting the payment request form to the initiator computing device 104, the input/output engine 302 may receive payment data that the initiator 114 inputted into the payment request form. In certain example embodiments, the payment data may include the unique identifier of the receiver, the payment amount, and an identifier of the initiator. In other example embodiments where the intelligent messaging application is integrated with the banking application of the initiator bank 112, the payment data may additionally include a payment account identifier (account number) of the initiator 114. In either case, responsive to receiving the payment data, the input/output engine 302 may transmit the payment data to the request generation engine 310. The request generation engine 310 may generate and forward an electronic payment request file comprising the payment data to the intelligent messaging server 204.

In response to transmitting the electronic payment request file to the intelligent messaging server 204, the input/output engine 302 may receive one of (i) a request to generate an electronic selection message, (ii) a request to generate an electronic registration message, and (iii) a request to generate a confirmation message.

In particular, if the intelligent messaging server 204 has all the necessary information to generate a payment request record (described in greater detail in association with FIGS. 4-8), the intelligent messaging server 204 may request the mobile application server 202 to generate and transmit a confirmation message to the initiator computing device 104 and/or the receiver computing device 106. Accordingly, upon receiving the request to generate the confirmation message, the input/output engine 302 may operate in concert with the message generation engine 306 and the user-interface engine 308 to generate two different confirmation messages, one for the initiator 114 and the other for the receiver 116. Further, the input/output engine 302 may transmit the initiator confirmation message to the initiator computing device 104 and the receiver confirmation message to the receiver computing device 106. Alternatively, in some example embodiments, the message generation engine 306 may generate only one confirmation message either to the initiator 114 or the receiver 116. That is, in said example embodiment, only one of the initiator 114 and the receiver 116 may receive the confirmation message. As described earlier, the confirmation message informs the initiator 114 and/or the receiver 116 of a successful creation of a pending payment request.

However, if the intelligent messaging server 204 determines that the receiver 116 has multiple payment accounts, in some embodiments, the intelligent messaging server 204 may request the mobile application server 202 to generate and transmit an electronic selection message to the receiver computing device 106. The request to generate the electronic selection message may include, inter alia, (i) representative information (e.g., alias, last four digits of account number, etc.,) associated with each of the multiple payment accounts, and (ii) an electronic contact information of the receiver that can be used to send electronic messages to the receiver.

In certain example embodiments, electronic contact information may be the unique identifier of the receiver 116 that is inputted by the initiator 114 in the payment request form. For example, if the unique identifier of the receiver 116 is an e-mail address of the receiver 116, or a mobile phone number of the receiver 116, etc., that can be readily used to electronically communicate with the receiver 116, said unique identifier of the receiver 116 may be used as the electronic contact information. However, in other example embodiments, if the unique identifier of the receiver 116 is not conducive for sending send electronic messages to the receiver, the intelligent messaging server 204 may retrieve an appropriate electronic contact information of the receiver 116 from the one or more directories 108*a-c* and send it to the mobile application server 202. For example, if the unique identifier of the receiver 116 is customer reference number, a professional registration number, etc., that cannot be used to send electronically communicate with the receiver 116, the intelligent messaging server 204 may use the unique identifier of the receiver 116 to retrieve a payment account information of the receiver 116 from one or more directories 108*a-c*. Further, the intelligent messaging server 204 may retrieve an electronic contact information, such as the receiver's e-mail address or phone number from the payment account information and forward the retrieved electronic contact information to the mobile application server 202. In some example embodiments, if the electronic contact information of the receiver is not available in the payment account information, the intelligent messaging server 204 may request the mobile application server 202 to generate a message that prompts the initiator 114 to provide an appropriate electronic contact information of the receiver 116.

In yet another example embodiment, if the unique identifier of the receiver 116 is a modified version of the receiver's electronic contact information, the intelligent messaging server 204 and/or the mobile application server 202 may process the unique identifier to reconstruct the original electronic contact information of the receiver. For example, the unique identifier of the receiver 116 provided by the initiator 114 may be a modified version of the receiver's e-mail address that adds specific characters before and after the e-mail address. In said example, upon receiving said unique identifier (modified e-mail address), the intelligent messaging server 204 and/or the mobile application server 202 may reconstruct the original e-mail address of the receiver by removing the specific characters that are added before and after the e-mail address. In particular, the intelligent messaging server 204 and/or the mobile application server 202 may reconstruct the original e-mail using the logic that was initially used to modify the e-mail address.

In either case, responsive to receiving the request to generate the electronic selection message from the intelligent messaging server 204, the input/output engine 302 may operate in concert with the message generation engine 306 and the user-interface engine 308 to generate and transmit the electronic selection message to the receiver computing device 106. As described earlier, the electronic selection message may include a pointer (e.g., hyperlink), that when selected, directs the receiver 116 to a secure web document that lists the representative information of the multiple payment accounts and prompts the receiver 116 to select one of the multiple payment accounts.

Responsive to transmitting the electronic selection message to the receiver computing device 106 and responsive to the receiver 116 selecting one of the multiple payment accounts, the mobile application server 202 may receive a signal indicating the selection made by the receiver. Further, the mobile application server 202 forward the receiver's selection to the intelligent messaging server 204 to generate the payment request record.

In certain example embodiments, if the intelligent messaging server 204 determines that the receiver 116 is not a registered user of the intelligent messaging system 102, the intelligent messaging server 204 may request the mobile application server 202 to generate and transmit an electronic registration message to the receiver computing device 106. The request to generate the electronic registration message may include, inter alia, the unique identifier of the receiver. Responsive to receiving the request to generate the electronic registration message, the input/output engine 302 may operate in concert with the message generation engine 306 and the user-interface engine 308 to generate and transmit the electronic registration message to the receiver computing device 106 using the unique identifier of the receiver 116. If the unique identifier of the receiver 116 cannot be readily used to send electronic communications to the receiver 106, then, the intelligent messaging server 204 and/or the mobile application server 202 may request the initiator 116 to provide an appropriate unique identifier of the receiver 116. As described earlier, the electronic registration message may include a pointer (e.g., hyperlink), that when selected, directs the receiver to a secure web document that prompts the receiver 116 to provide temporary registration information.

Responsive to transmitting the electronic registration message and the receiver 116 providing temporary registration information, the input/output engine 302 may receive and forward the temporary registration information to the intelligent messaging server 204 for generating the payment request record.

Returning back to the step of presenting the intelligent messaging services menu to the initiator 114, if the initiator 114 selects a receiver lookup service, the input/output engine 302 may operate in concert with the user-interface engine 308 to present a search field to the initiator computing device 104. The search field may prompt the initiator 114 to input a search string associated with the receiver 116. For example, the initiator 114 may enter the receiver's first name, last name, full name, a company name if the receiver is a business entity, unique identifier of the receiver, etc. In some example embodiments, the search field may allow the receiver 116 to input a combination of search strings, such as name, location, etc.

The payment computing device 104 may transmit the search string to the input/output engine 302 of the mobile application server 202. Responsively, the input/output engine 302 may forward the search string to the intelligent messaging server 204. In response, the input/output engine 302 may receive a list of one or more receivers whose data records (in the directories 108a-c) fully or partially match the search string. For example, if the search string is 'John', the intelligent messaging server 204 may search the directories 108a-c for all receiver's having the name John. In said example, the search may produce four results: John Doe, Johnathan Roe, John F. Doe, and Johnathan A. Roe. Alternatively, if the search string includes the name of a company such as 'IBM', the search result may include the different branch locations of IBM, subsidiaries of IBM, and so on.

Responsive to receiving the list of the one or more receivers that match the search string, the input/output engine 302 in combination with the user-interface engine 308 may transmit the list of one or more receivers to the initiator computing device 104 for presentation to the initiator 114. Further, the initiator 114 may be prompted to select one of the one or more receivers that is of interest to the initiator 114. Once the initiator 114 has selected a receiver 116 that is of interest to the initiator 114, the input/output engine 302 may receive a signal that identifies the initiator's selection. Responsively, the input/output engine 302 may forward the initiator's selection to the intelligent messaging server 204 to retrieve additional information of the receiver 116. Responsive to receiving the additional information from the intelligent messaging server 204, the mobile application server 202 may present the additional information to the initiator 114 based on the registration rights and privileges of the initiator 114. That is, the granularity of the additional receiver information presented to the initiator 114 may vary based on the registration rights and privileges of the initiator 114.

In some example embodiments, transmitting a message to the receiver computing device 106 and/or initiator computing device 104 may include sending an SMS, text message, etc., to the initiator computing device 106 and/or initiator computing device 104. However, in other embodiments, transmitting a message to the receiver computing device 106 and/or initiator computing device 104 may include sending a message to an e-mail server which the receiver 116 and/or the initiator 114 may then access using the receiver computing device 106 and/or initiator computing device 104, respectively. In yet another example embodiment, transmitting a message to the receiver computing device 106 and/or initiator computing device 104 may include any other appropriate electronic communication mechanism, such as social network messages, messenger messages, pager messages, etc., without departing from a broader scope of the present disclosure. Further, said messages may be presented to the user in a visual, auditory, tactile, or any other appropriate form. Furthermore, the user may respond to said messages through touchscreen input, keypad input, and/or gesture inputs, etc., provided such capabilities are available within the receiver computing device 106 and/or initiator computing device 104.

Even though the present disclosure describes sending the electronic selection message and the electronic registration message including a link that directs the receiver to a secure web document, one of ordinary skill in the art can understand and appreciate that in some embodiments, a plain text/web document may be sent directly to the receiver computing device via a secure and encrypted communication link, such as port 443 communication (HTTPS). That is, the secure web document may be sent in place of or embedded directly within the electronic selection message and the electronic registration message.

One of ordinary skill in the art can understand and appreciate that all communications between the initiator computing device 104, the mobile application server 202, the intelligent messaging server 204, and/or the receiver computing device 106 may be secure and encrypted. Further, even though the mobile application server 202 and the intelligent messaging server 202 are described as being two separate servers, one of ordinary skill in the art can understand and appreciate that in some embodiments, the mobile application server 202 may be integrated with the intelligent messaging server 204. Furthermore, one of ordinary skill in the art can understand and appreciate that in some embodiments, one or more operations of the mobile application server 202 may be performed by the intelligent messaging server 204 and vice-versa.

ii. Intelligent Messaging Server

Turning to FIG. 4, this figure illustrates a block diagram of the intelligent messaging server 204 of FIG. 2, in accordance with an example embodiment. In particular, FIG. 4 illustrates an input/output engine 402, a directory creation engine 404, a routing table creation engine 406, a receiver query engine 408, an account retrieval engine 410 (also interchangeably referred to as 'account retrieval engine 410'), a message generation engine 412, a message file engine 414, a temporary registration engine 416, an activity log engine 418, a memory 420, a processor 422, a routing table database 424, a message file database 426, an activity log database 428, and/or a temporary registration database 430.

Although FIG. 4 of the present disclosure illustrates engines 402-418 and databases 424-430 as being part of the intelligent messaging server 204, one of ordinary skill in the art can understand and appreciate that the one or more of the engines 402-418 and/or databases 424-430 may be implemented as a separate standalone components that are external to and communicably coupled to the intelligent messaging server 204.

Further, the intelligent messaging server 204 may be implemented using one or more data processing devices, either as a distributed server system where the operations of the intelligent messaging server 204 may be distributed between one or more data processors or as a centralized server system where the operations of the intelligent messaging server 204 may be handled by a single data processor.

As illustrated in FIG. 4, the intelligent messaging server 204 may include a processor 422, where the processor 422 may be a multi-core processor or a combination of multiple single core processors. Further, the intelligent messaging server 204 may include a memory 420 coupled to the processor 422. The memory 420 may be non-transitory storage medium, in one embodiment, and a transitory storage medium in another embodiment. The memory 420 may include instructions that may be executed by the processor 422 to perform operations of the intelligent messaging server 204. In other words, operations associated with the different engines of the intelligent messaging server 204 may be executed using the processor 422.

Further, as illustrated in FIG. 4, the intelligent messaging server 204 may include an input/output engine 402 that is configured to enable communication to and from the intelligent messaging server 204. In particular, the input/output engine 402 may receive input from the mobile application server 202, the directories 108a-c and their respective financial entities, the initiator bank computing system, and/or the receiver bank computing system. Example inputs received by the input/output engine 402 may include, but are not limited to, registration data files from the directories (108a, c) and/or their respective financial entities, payment account data files from the directories (108a,c) and/or their respective financial entities, electronic payment request files and receiver lookup request files from the mobile application server 202, payment transfer completion messages from the payment network 122, and payment account information from the directories 108a-c. In response to receiving the input, the intelligent messaging server 204 may generate one or more outputs for transmission to the mobile application server 202, the initiator computing device 104, the receiver computing device 106, the initiator bank computing system, the receiver bank computing system, and/or the directories 108a-c. In particular, example outputs transmitted by the input/output engine 402 may include, but are not limited to, payment account information query to the directories 108a-c, electronic selection message to the receiver computing device 106, request to generate electronic selection message to the mobile application server 202, electronic registration message to the receiver computing device 106, request to generate electronic registration message to the mobile application server 202, response to the receiver lookup query, and payment message data files to the payment network 122.

In one example embodiment, the input/output engine 402 of the intelligent messaging server 204 may receive registration data files from one or more directories (108a,c) of the financial entities whose customers want to receive services offered by the intelligent messaging system 102. Responsively, the input/output engine 402 may forward the registration data file to the routing table creation engine 406. If the location address of the directories are not included in the registration data file, the routing table creation engine 406 may operate in concert with the processor 422 to extract the location information of the directories from a header of the registration data file. Once the routing table creation engine 406 has both the unique identifier of the customer and the location information of the directories that include the payment account information of the customer's payment account, the routing table creation engine 406 may add said information to a routing table in the routing table database 424. If a customer has multiple payment accounts and each of the payment accounts are registered using the same unique identifier, the routing table creation engine 406 may link the multiple payment accounts to the customer within the routing table. Alternatively, if the multiple payment accounts are registered using multiple unique identifiers and the customer manually identifies the multiple payment accounts associated with the customer using the intelligent messaging application, the routing table creation engine 406 may link/connect identified multiple payment accounts to the customer in the routing table.

In addition to storing the unique identifier of the customer and the location information of the directories, the routing table creation engine 406 may also store the preferences of the customer and/or a financial entity regarding which of the multiple payment accounts is to be chosen as a default payment account, aliases of the payment accounts, and/or registration rights and privileges of the customer in the routing table database 424.

In certain example embodiments, in addition to the registration data files, the input/output engine 402 may receive payment account data files from the directories (108a,c). In some embodiments, the financial entities may not send both the registration data files and the payment account data files. Instead, they may only send the payment account data files. Further, the intelligent messaging server may extract the necessary routing table information from the payment account data files.

In either case, upon receiving the payment account data files, the input/output engine 402 of the intelligent messaging server 204 may forward the payment account data files to directory creation engine 404. Responsive to receiving the payment account data files, the directory creation engine 404 may operate in concert with the processor 422 to extract payment account information from the payment account data files, transform the payment account information to a format compatible with the intelligent messaging system 102, and load/store the extracted and transformed payment account information to the multi-tenant directory 108*b*.

Once a financial entity customer has registered with the intelligent messaging system 102, the financial entity customer may decide to initiate a payment transaction with another user through the services offered by the intelligent messaging system 102. For example, an initiator 114 may decide to send payments to a receiver 116. Accordingly, in certain example embodiments, the input/output engine 402 of the intelligent messaging server 102 may receive an electronic payment request file from the mobile application server 202 and forward it to the account retrieval engine 410. As described earlier, the electronic payment request file may include, but is not limited to, a unique identifier of the receiver, the receiver amount, an identifier of the initiator, and/or a payment account identifier (e.g., account number) of the initiator.

Upon receiving the electronic payment request file, the account retrieval engine 410 may retrieve the unique identifier of the receiver (hereinafter 'receiver identifier') from the electronic payment request file and compare the retrieved receiver identifier against a list of unique identifiers of registered users in the routing table of the intelligent messaging server 204. If the receiver identifier matches a unique identifier of a registered user in the routing table, then, the account retrieval engine 410 determines that the receiver represented by the receiver identifier is a registered user of the intelligent messaging system 102. Responsive to determining that the receiver is a registered user, the account retrieval engine 410 may retrieve, from the routing table, directory location information associated with the unique registered user identifier that matches the receiver identifier.

In the routing table, each payment account of the receiver 116 may be given a directory location information of the corresponding directory that maintains the payment account information of the respective payment account. For example, a receiver X may have four payment accounts. Payment account information associated with the first two payment accounts may be stored in the multi-tenant database, payment account information of the third payment account may be stored in a trusted directory 108*a*, and payment account information of the fourth payment account may be stored in a third party directory 108*c*. In said example, a routing table entry for receiver X may include the unique identifier of the receiver X, such as receiver X's e-mail address, and three directory location information for the four payment accounts. That is, a multi-tenant directory location for the first payment account and the second payment account, a trusted directory location of the third payment account, and a third party directory location for the fourth payment account. In some example embodiments, the routing table may also include aliases associated with each payment account to specifically identify each payment account. Accordingly, in said example, in addition to the directory locations, the routing table may be aliases for the first, second, third, and fourth payment accounts. So, even if the first payment account and the second payment account only has one multi-tenant location information, the aliases will help the intelligent messaging server 204 to recognize that there are two payment accounts of the receiver stored in the multi-tenant directory.

Based on the directory location information retrieved from the routing table, the account retrieval engine 410 may determine whether the receiver 116 has multiple payment accounts. For example, if the receiver identifier is associated with directory location information for more than one directory, then, the receiver is determined to have multiple payment accounts.

Upon determining that the receiver has multiple payment accounts, the account retrieval engine 410 may set a multiple accounts flag. Responsive to setting the multiple accounts flag, the account retrieval engine 410 may operate in concert with the input/output engine 402 to generate and transmit a payment account information query to each directory identified by the directory location information (associated with unique registered user identifier that matches the receiver identifier) retrieved from the routing table. The payment account information query to each directory may include the receiver identifier and a request to send payment account information associated with one or more payment accounts of the receiver 116 maintained in the respective directory.

In response to the payment account information query, the input/output engine 402 of the intelligent messaging server 204 may receive specific payment account information associated with each payment account of the receiver from the respective directories 108*a-c*. For example, the intelligent messaging server 204 may receive a payment account number and representative information (e.g., alias, bank name, etc.) associated with each payment account of the receiver stored in the respective directory 108*a-c*. However, in another example embodiment, in response to the payment account information query, the intelligent messaging server 204 may receive all available payment account information associated with the receiver's payment account(s). In yet another example embodiment, the directories 108*a-c* may only send payment account information associated with specific payment accounts of the receiver rather than sending payment account information of all the payment accounts of the receiver in the respective directory. For example, even though a multi-tenant directory 108*b* may have payment account information associated with three payment accounts of receiver Y, the multi-tenant directory 108*b* may send payment account information associated with the first and third payment account of receiver Y based on a corresponding request from the intelligent messaging server 204. That is, the request may specifically ask for payment account information associated with the first and third payment account. In said example, the request from the intelligent messaging server 204 may include the unique identifier of the receiver Y and aliases associated with the first and third payment account (received during registration in the registration data file) which in turn enables the multi-tenant directory 108*b* to recognize that the intelligent messaging server 204 only needs payment account information associated with the first and third payment account of receiver Y.

In either case, responsive to receiving the payment account information from the directories and responsive to determining that the multiple account flag is set, the account retrieval engine 410 may operate in concert with the message generation engine 412 and the input/output engine 402 to generate and transmit an electronic selection message to the receiver computing device 106. As described earlier, the electronic selection message may include a link, that when selected, directs the receiver to a secure web document that comprises a list of representative information of the multiple payment accounts. Further, the secure web document prompts the receiver 116 to select one of the multiple payment accounts. Alternatively, the intelligent messaging server 204 may forward the payment account information (e.g., alias of payment accounts) to the mobile communication server 202 and request the mobile communication server 202 to generate and transmit an electronic selection message to the receiver computing device 106.

In some example embodiments, responsive to receiving the payment account information from the directories and responsive to determining that the multiple account flag is set, the account retrieval engine 410 may access the routing table database 424 to retrieve a receiver and/or financial entity preference data, if available. As described earlier the receiver and/or financial entity preference data may include instructions regarding selecting one of the multiple payment accounts as a default payment account. If such receiver and/or financial entity preference data is available, the account retrieval engine 410 may select one of the multiple payment accounts as the preferred/default payment account as instructed in the receiver and/or financial entity preference data. In said embodiment where the account retrieval engine 410 may select one of the multiple payment accounts as the preferred/default payment account, the intelligent messaging server 204 and/or the mobile application server 202 may not send an electronic selection message to the receiver computing device 106. Alternatively, in some embodiments, the intelligent messaging server 102 (e.g., the message generation engine 412) may provide an option to the receiver 116 to override the default payment account selected by the intelligent messaging server 102, provided a payment request record associated with the default payment account has not been transmitted to the payment network for clearing and settlement of a respective payment transaction.

Once a payment account from the multiple payment accounts is selected either by the receiver 116 and/or by the intelligent messaging server 204, the account retrieval engine 410 in combination with the message file engine 414 may generate a payment request record. The payment request record may include, but is not limited to, (i) a payment account identifier (e.g., account number) of the selected payment account of the receiver 116 (received from the directories 108a-c), (ii) the payment amount received from the electronic payment request file, and (iii) the payment account identifier (e.g., account number) of the initiator 114 received from the electronic payment request file. In certain example embodiments where the payment account identifier (e.g., account number) of the initiator 114 is not included in the electronic payment request file, the account retrieval engine 410 may retrieve the payment account identifier (e.g., account number) of the initiator's payment account from the directories 108a-c using an identifier of the initiator 114. The process of the retrieving the payment account identifier of the initiator's payment account may be substantially similar to the process of the retrieving the payment account identifier of the receiver's payment account described above and accordingly will not be repeated herein for sake of brevity. In general, the payment request record may include any appropriate information required by the payment network 122 to clear and settle the payment transfer from the initiator to the receiver.

In some example embodiments where the multiple accounts flag is not set, i.e., the receiver has only a single payment account, the account retrieval engine 410 generates and transmits a payment account retrieval query to the directory identified by the directory location information associated with the single payment account. Responsively, as described above, the account retrieval engine 410 receives the payment account information including the payment account identifier (e.g., account number) of the receiver's single payment account. Upon receiving the payment account identifier, the account retrieval engine 410 operates in concert with the message file engine 414 to generate a payment request record that includes at least the received payment account identifier (e.g., account number) of the receiver's payment account, the payment amount, and the payment account identifier (e.g., account number) of the initiator's payment account.

In certain example embodiments, a comparison of the receiver identifier (retrieved from the electronic payment request file) against the list of unique identifiers of registered users in the routing table of the intelligent messaging server 204 may fail. That is, the receiver identifier may not be present in the routing table and accordingly, may not match with any of the unique registered user identifiers in the routing table. If the receiver identifier does not match any of the unique customer identifiers in the routing table, then, the account retrieval engine 410 determines that the receiver represented by the receiver identifier is not a registered user of the intelligent messaging system 102. Responsive to determining that the receiver is not a registered user of the intelligent messaging system 102, the account retrieval engine 410 may operate in concert with the message generation engine 412 and the input/output engine 402 to generate and transmit an electronic registration message to the receiver computing device 106 using the unique identifier of the receiver. As described earlier, the electronic selection message may include a link, that when selected, directs the receiver to a secure web document that comprises a temporary registration form. Alternatively, the intelligent messaging server 204 may request the mobile communication server 202 to generate and transmit an electronic registration message to the receiver computing device 106.

In either case, responsive to transmitting the electronic registration message to the receiver computing device 106 and responsive to the receiver 116 filling the temporary registration form, the input/output engine 402 may receive and forward the temporary registration information included in the temporary registration form to the temporary registration engine 416. The temporary registration information may be a limited version of the payment account information. That is, the temporary registration information may include enough information for completing a payment request, such as payment account number, routing number, and so on, but may not include all the other data included in the payment account information. Alternatively, in other example embodiments, the temporary registration information may include additional information apart from the minimum amount of information required to complete a payment request.

Upon receiving the temporary registration information, the temporary registration engine 416 may store the temporary registration information in the temporary registration database 430. Further, the temporary registration engine 416 communicates with the message file engine 414 to generate a payment request record that includes at least the payment account identifier (e.g., account number) of the receiver's payment account included in the temporary registration information, the payment amount received from the electronic payment request file, and the payment account identifier (e.g., account number) of the initiator's payment account received from the directories 108a-c and/or the electronic payment request file.

Responsive to generating the payment request record, the message file engine 414 may add the generated payment request record to a payment message file that includes one or more payment request records. Further, the message file engine 414 stores the payment message file in the message file database 426.

In certain example embodiments, the intelligent messaging server 204 may transmit the payment message files stored in the message file database 426 to the payment network 122 (especially the initiator bank computing system) at the end of each day, as a batch process. In other example embodiments, the payment message files may be transmitted to the payment network 122 as and when a payment request record is generated and added to the payment message file. In yet another example embodiment, the payment message files may be transmitted periodically to the payment network 122 or upon receiving a corresponding request from the initiator bank computing system of the payment network 122.

Once the payment request record is generated and added to the payment message file, the message file engine 414 may operate in concert with the message generation engine 412 and/or the input/output engine 402 to generate and transmit confirmation messages to the receiver 116 and/or the initiator 114 informing them of a successful creation of a pending payment request.

Additionally, if the receiver 116 is temporarily registered with the intelligent messaging system 102, the temporary registration engine 416 of the intelligent messaging server 204 may identify the receiver bank 120 from the temporary registration information. Responsively, the temporary registration engine 416 may operate in concert with the message generation engine 412 and/or the input/output engine 402 to periodically generate and send messages to receiver bank 120 (e.g., computing system of receiver bank 120) informing the receiver bank 120 one of their customers, i.e., the receiver 116 has used the services of the intelligent messaging system 102 and requests the receiver bank 120 to register with the intelligent messaging system 102. Once the message has been sent to the receiver bank 120, the temporary registration engine 416 may delete the temporary registration information of the receiver 116. That is, the receiver 116 is provided a temporary registration that allows one-time use of the services offered by the intelligent messaging system 102. However, in some example embodiments, each temporary registration may allow a limited, but more than one-time use of the services offered by the intelligent messaging system 102. The number of times the receiver 116 may use the services offered by the intelligent messaging system 102 as a temporarily registered user may be determined/controlled by the receiver bank 120 and/or the intelligent messaging system 102.

In some embodiments, instead of sending payments to a receiver 116, the initiator 114 may choose to perform a receiver/receiver lookup. Responsively, the input/output engine 402 of the intelligent messaging server 102 may receive a receiver lookup request file that includes a search string and may forward it to the receiver query engine 408. Upon receiving the search string, the receiver query engine 408 may perform a tiered search (e.g., Google like search) within the directories 108a-c to initially identify a list of receivers whose data records fully matches or closely relates to the search string. Further, a list of all the receivers whose data records fully matches or closely relates to the search string may be forwarded to the initiator 114 via the mobile application server 202. Once the initiator 114 selects a receiver from the list of receivers, the receiver query engine 408 may requests the directories 108a-c to provide additional information associated with the selected receiver, e.g., payment account information. Once the additional information associated with the selected receiver is received, the receiver query engine 408 may access the routing table database 424 to retrieve a registration rights and privileges data associated with the initiator 114. Further, based on the registration rights and privileges of the initiator 114, the receiver query engine 408 determines the granularity of the additional information that may be presented to the initiator 114. Responsively, the receiver query engine 408 operates in concert with the input/output engine 402 to present at least a portion of the additional information to the initiator 114 based on the registration rights and privileges of the initiator 114.

III. Operations of the Intelligent Messaging System

The operations of the intelligent messaging system 102 are described in greater detail below in association with FIGS. 5-8. Accordingly, turning now to FIGS. 5-8, these figures include flowcharts that illustrate the process of the intelligent messaging system 102. Although specific operations are disclosed in the flowcharts illustrated in FIGS. 5-8, such operations are exemplary. That is, embodiments of the present invention are well suited to performing various other operations or variations of the operations recited in the flowcharts. It is appreciated that the operations in the flowcharts illustrated in FIGS. 5-8 may be performed in an order different than presented, and that not all of the operations in the flowcharts may be performed.

All, or a portion of, the embodiments described by the flowcharts illustrated in FIGS. 5-8 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the automated payment information system as described below.

i. Initial Set-Up/Registration Operation

Figure 5:
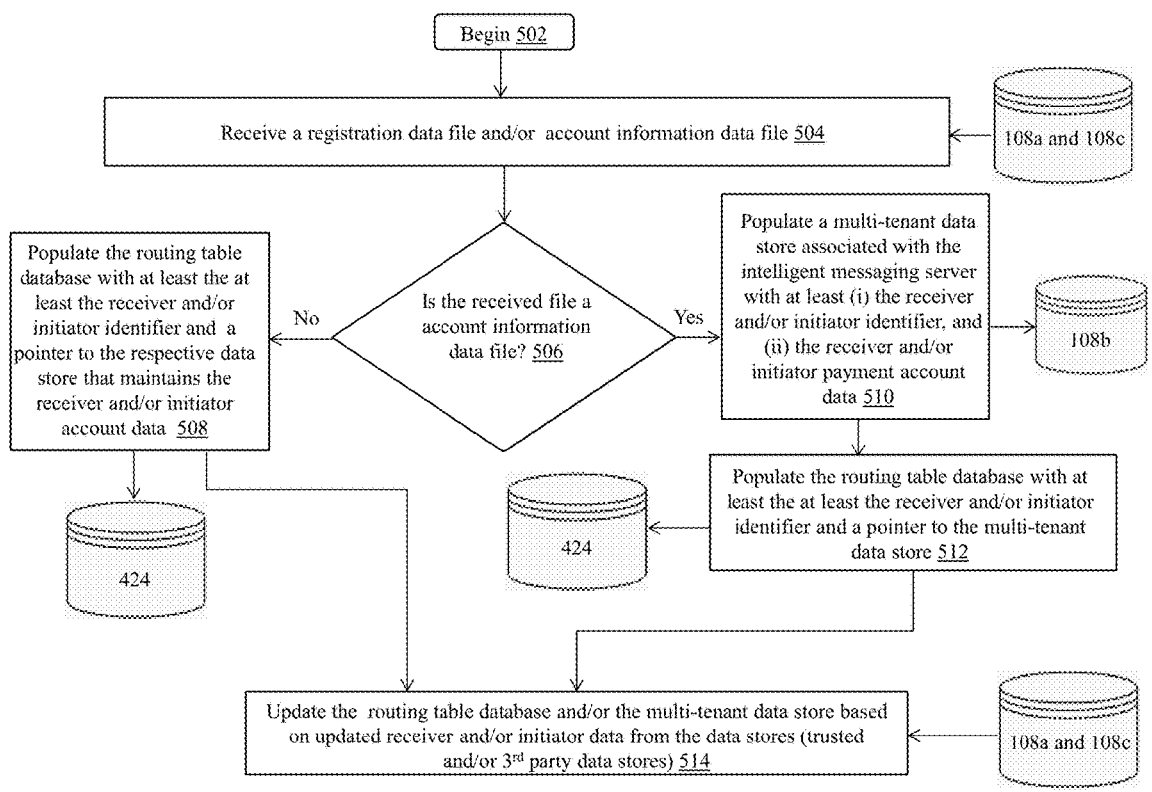
FIG. 5 is a flow chart that illustrates an initial set-up/registration process associated with the intelligent messaging system illustrated in FIG. 1, in accordance with example embodiments of the present disclosure.
Figure 6A:
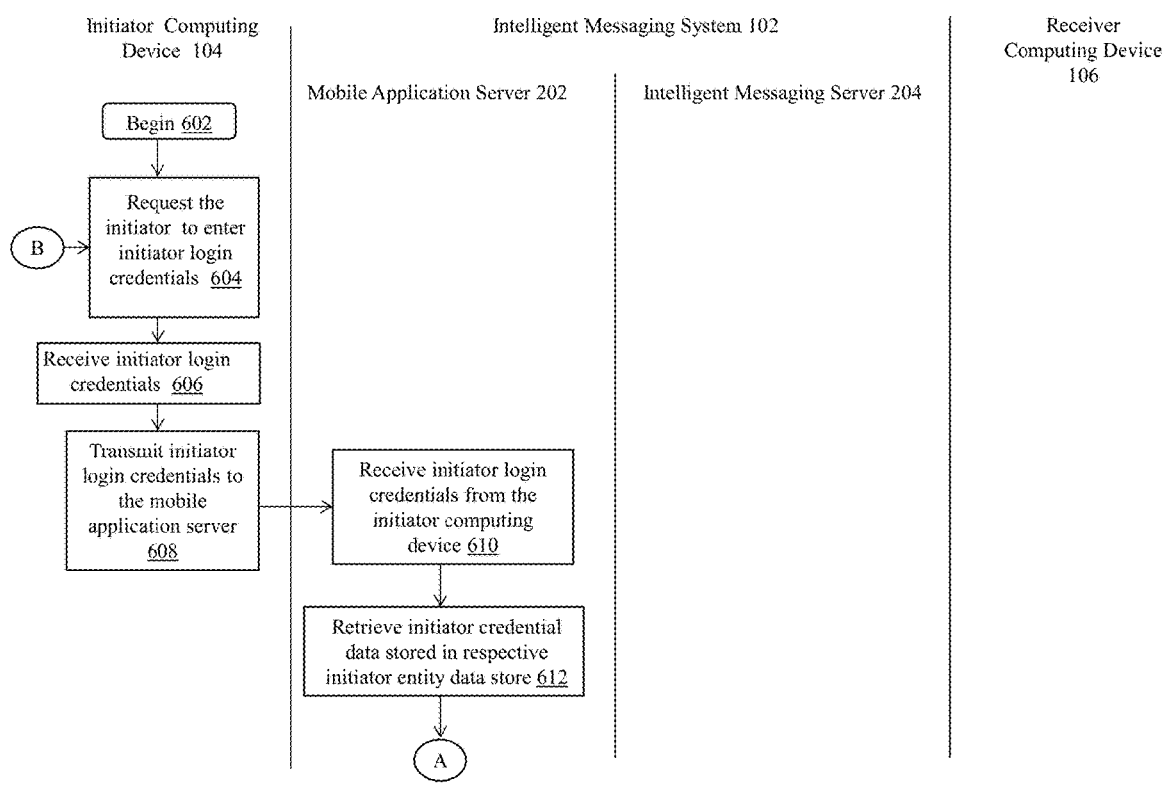
FIGS. 6A-6H (collectively 'FIG. 6') are flow charts that illustrates an example electronic message communications operation of the intelligent messaging system, in accordance with example embodiments of the present disclosure.
Figure 6B:
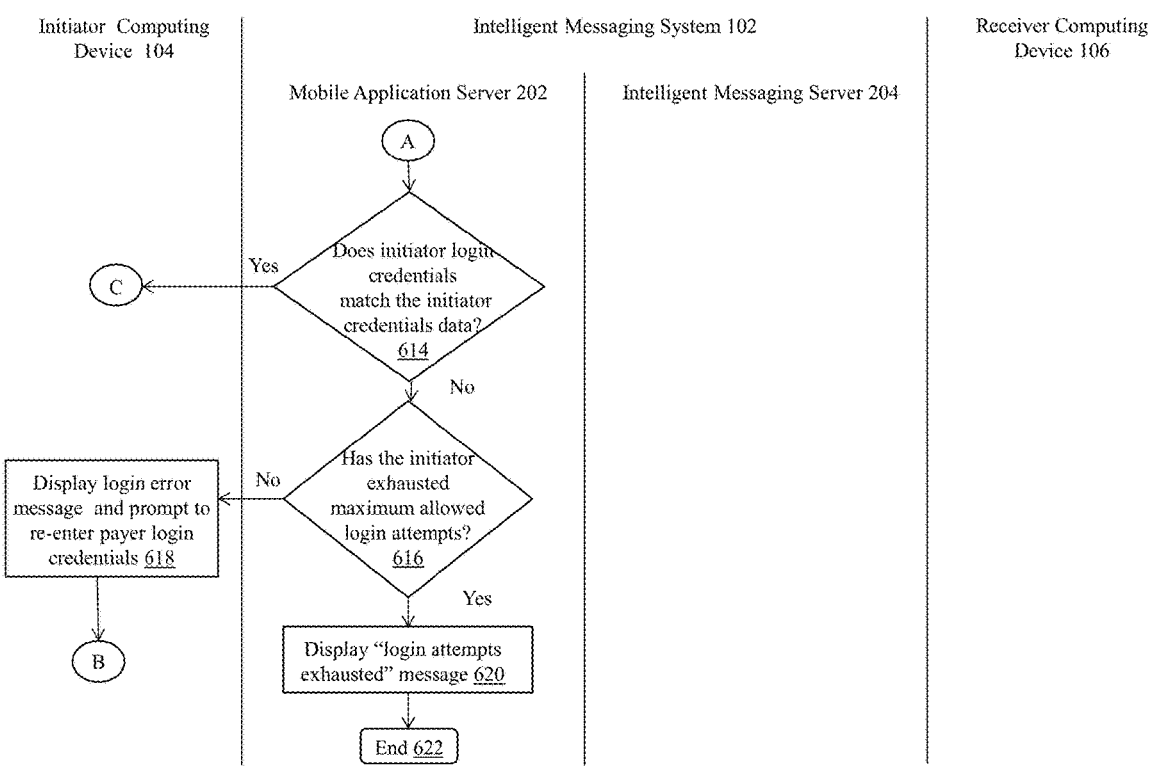
Figure 6C:
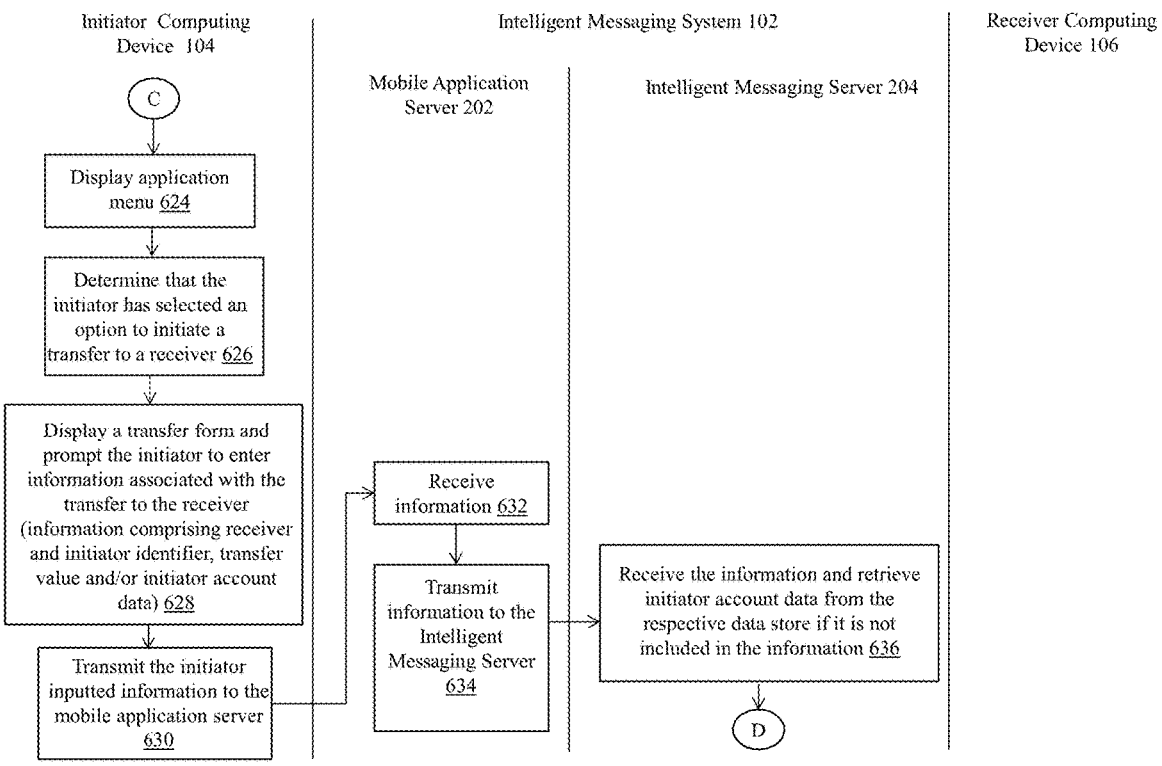
Figure 6D:
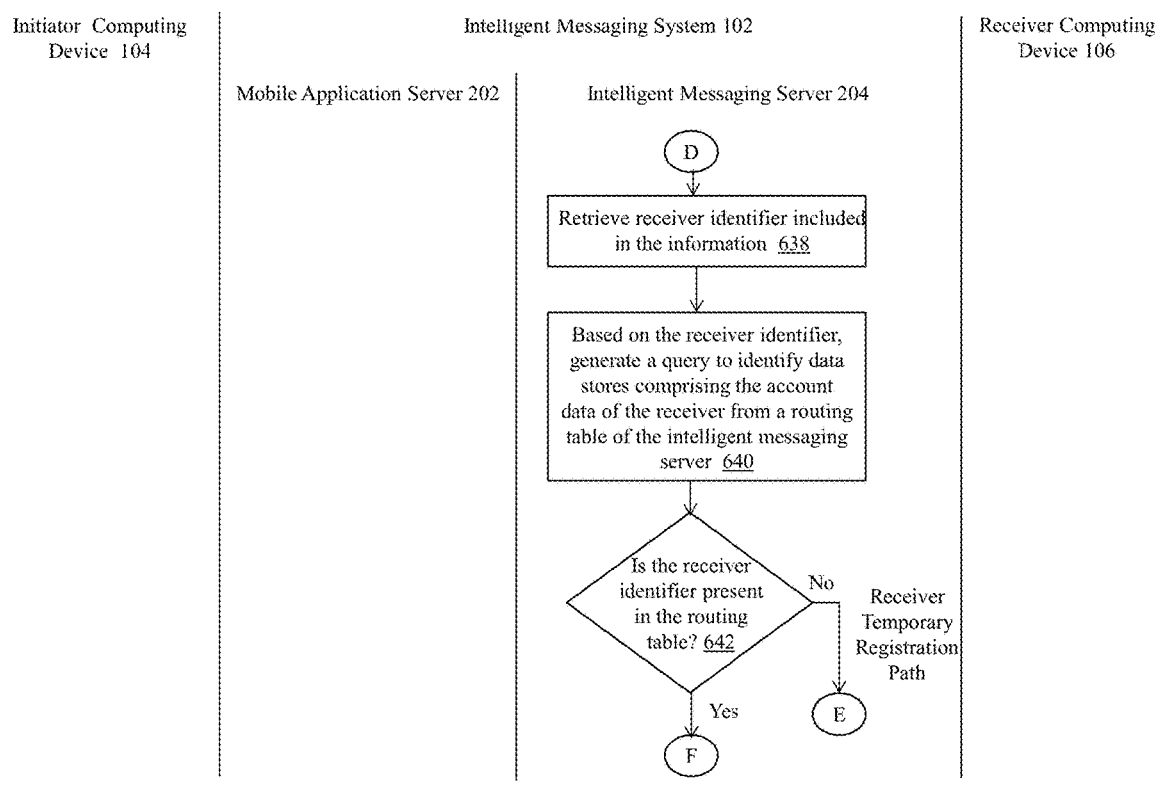
Figure 6E:
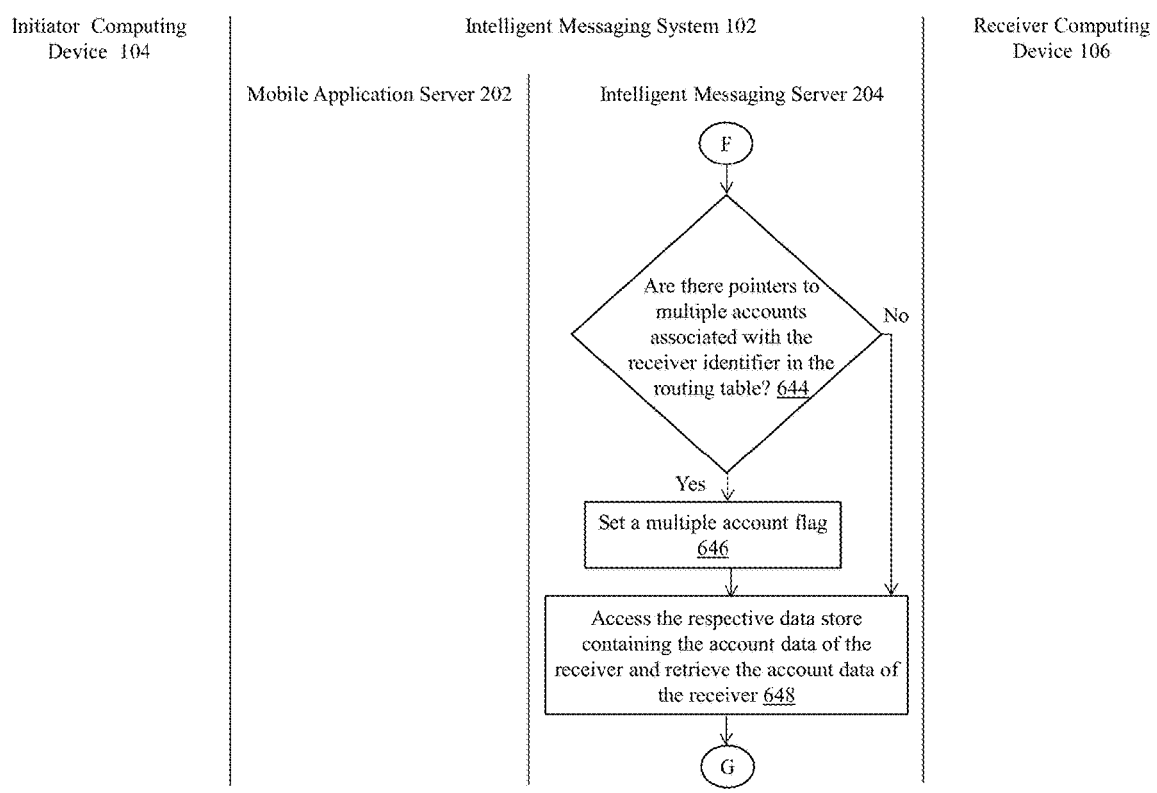
Figure 6F:
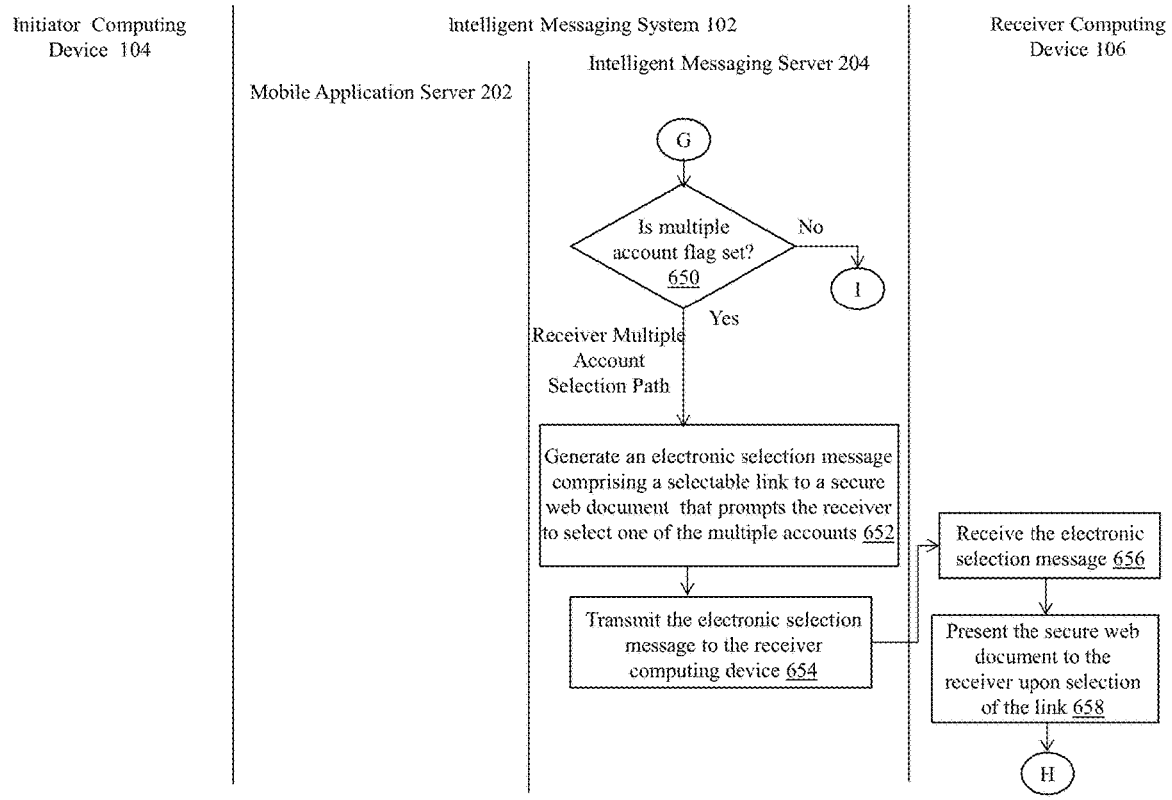
Figure 6G:
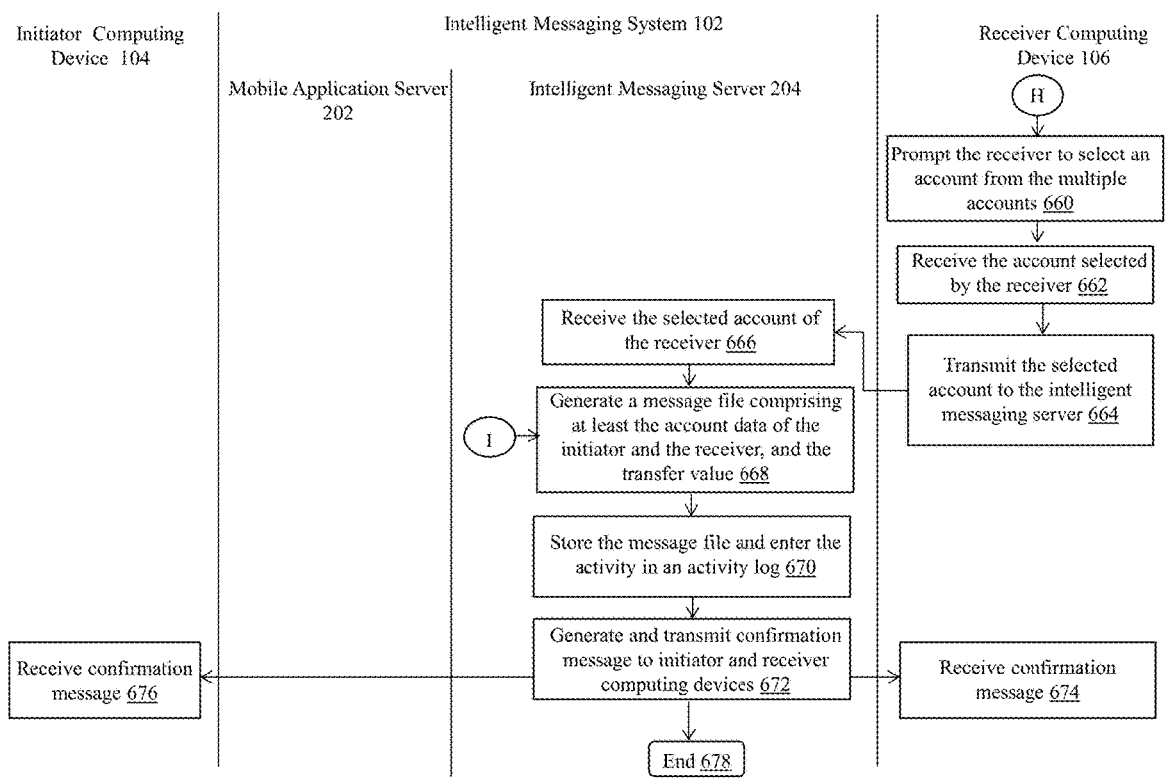
Figure 6H:
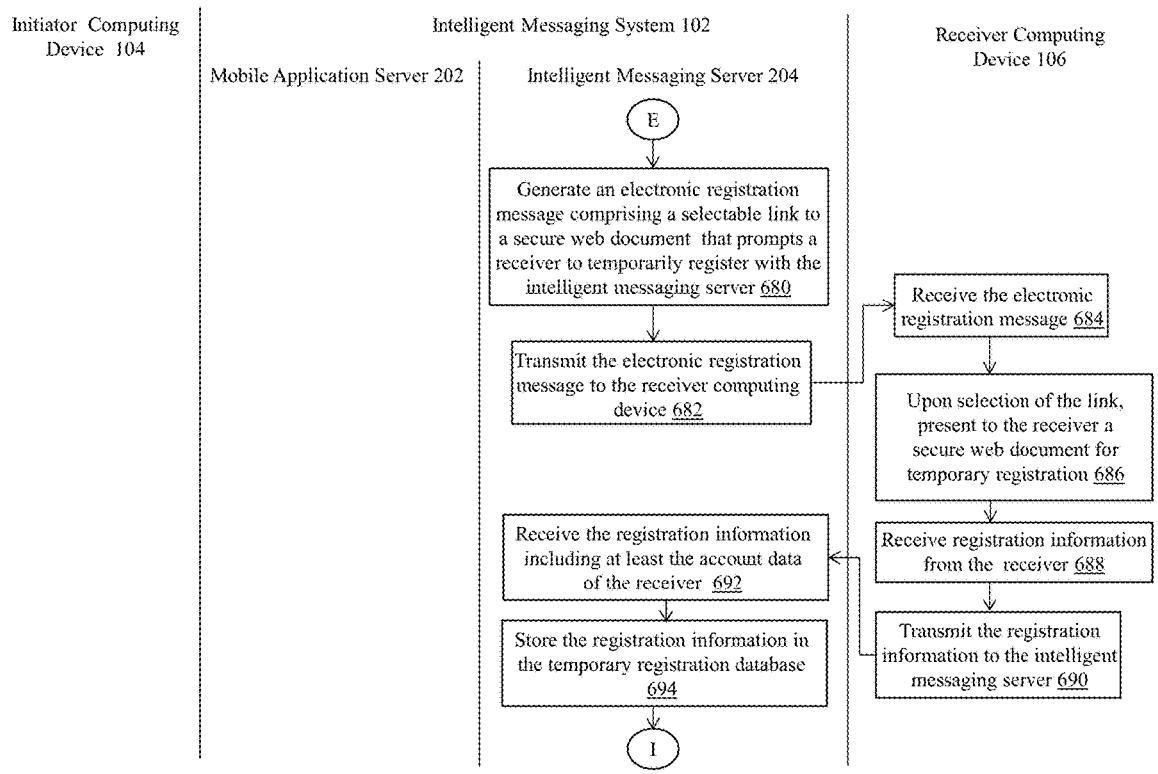
Figure 7A:
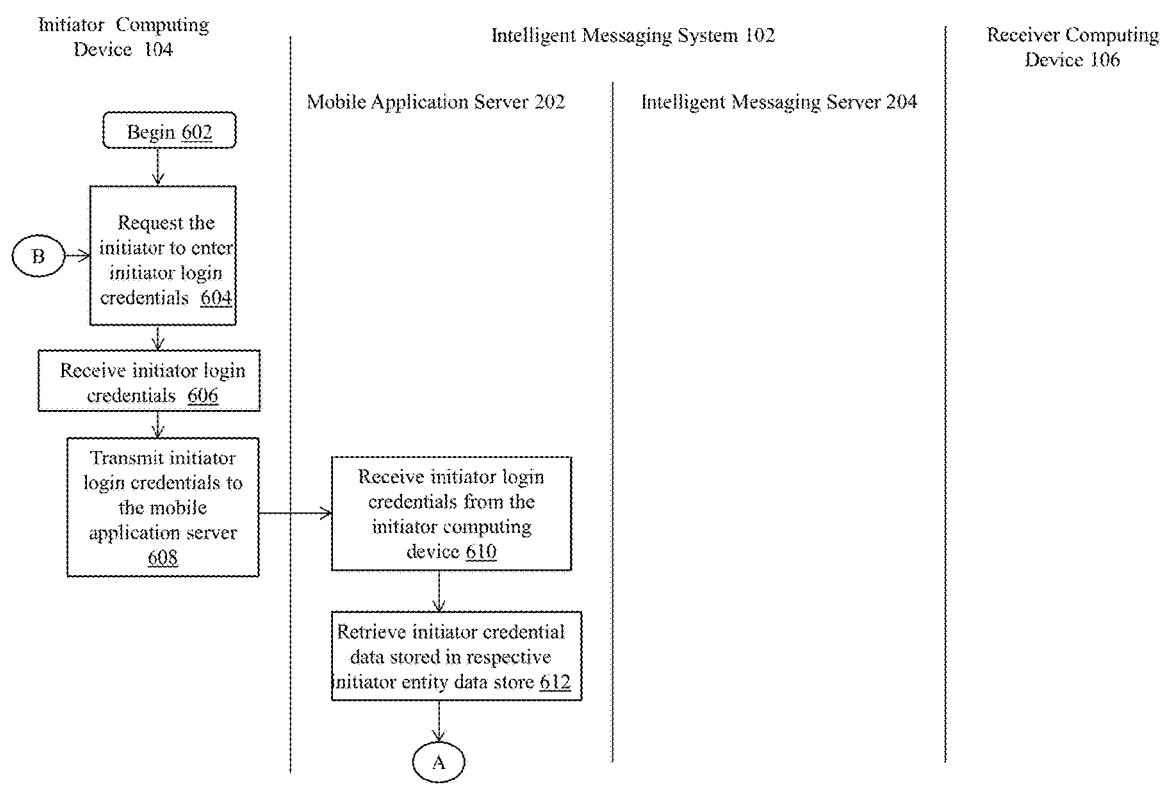
FIGS. 7A-7E (collectively 'FIG. 7') are flow charts that illustrates a receiver lookup operation of the intelligent messaging system, in accordance with example embodiments of the present disclosure.
Figure 7B:
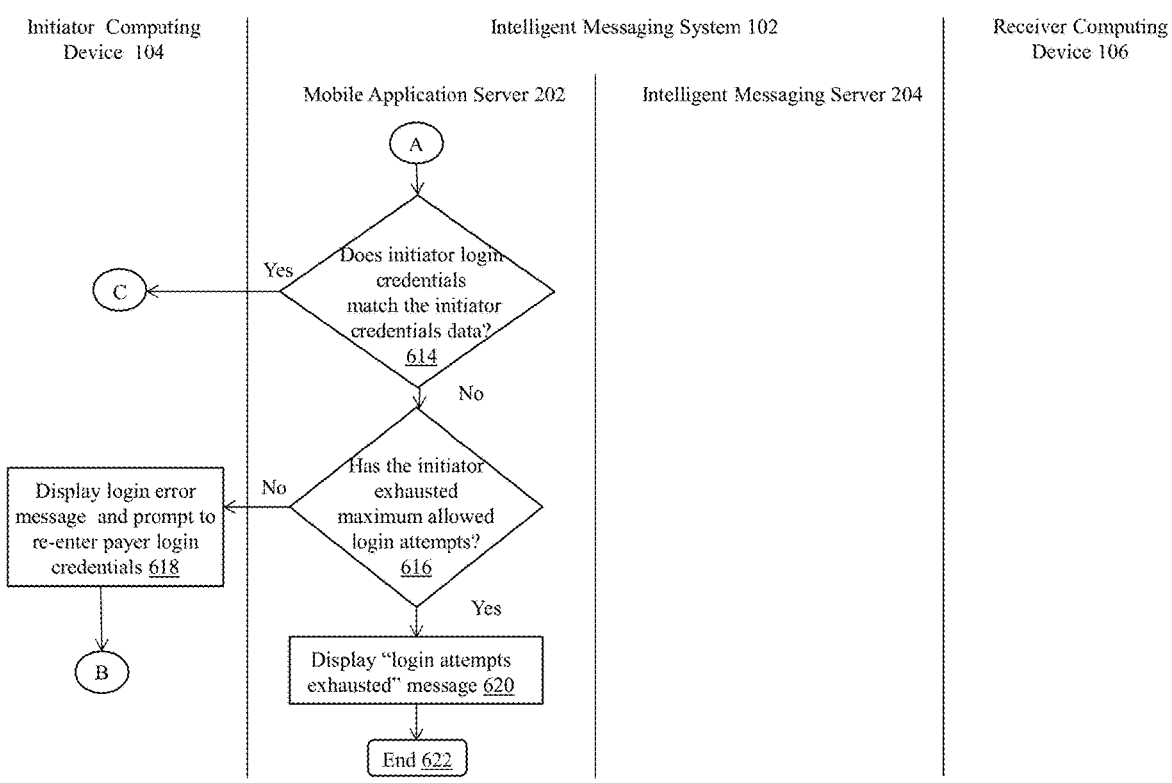
Figure 7C:
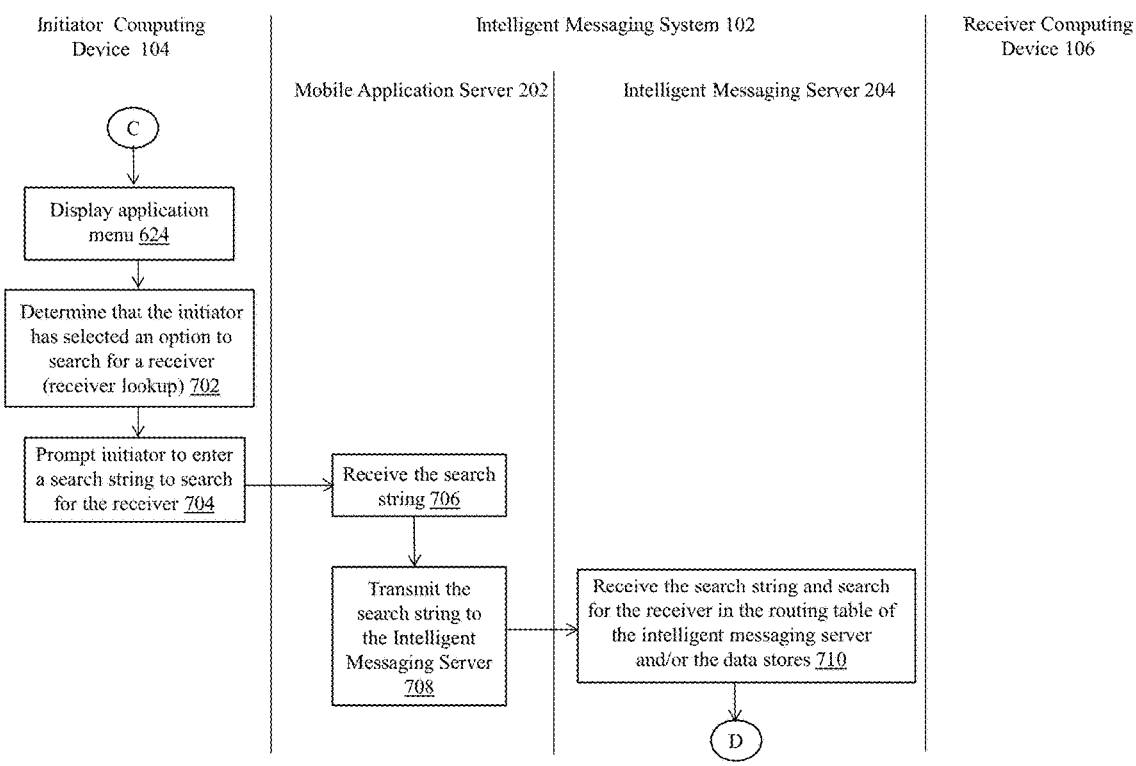
Figure 7D:
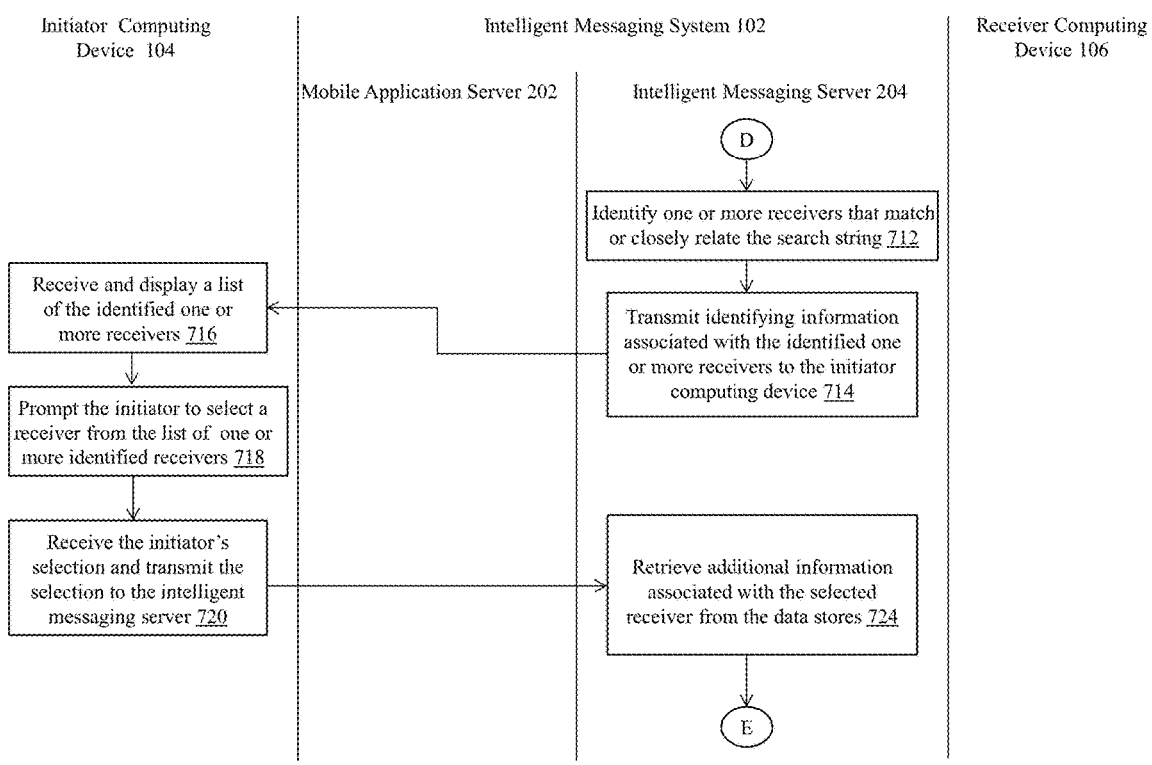
Figure 7E:
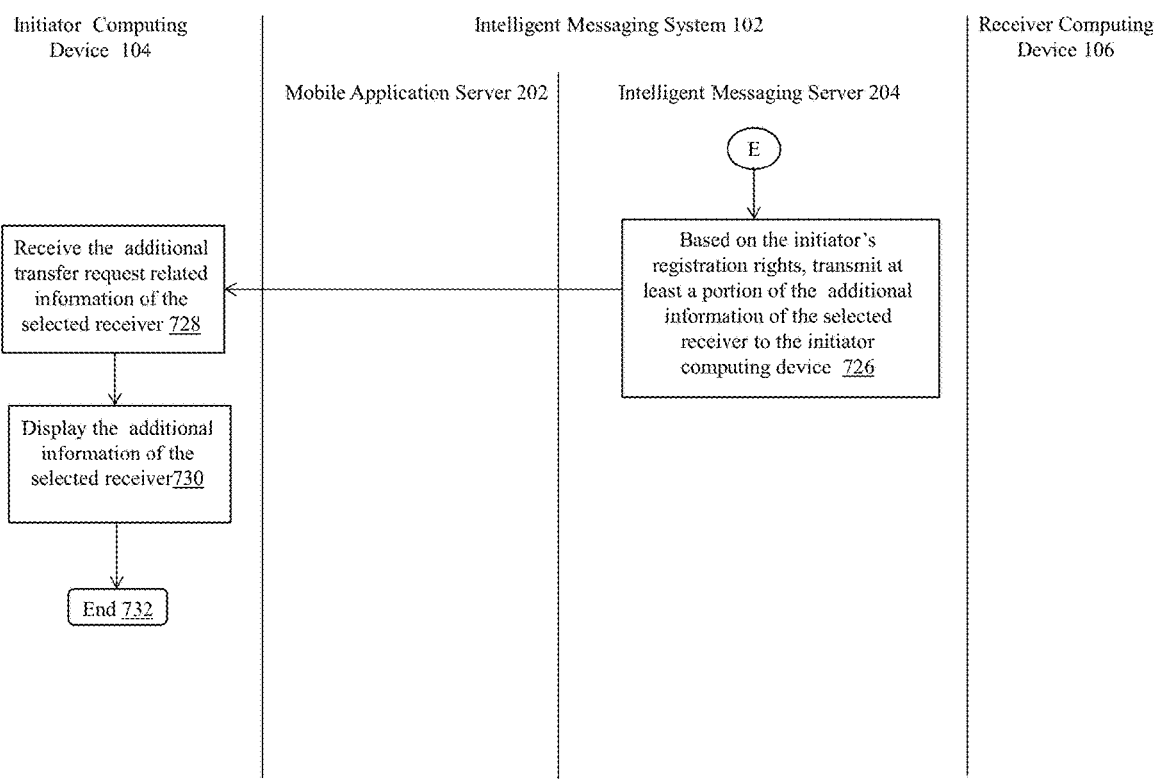
Figure 8A:
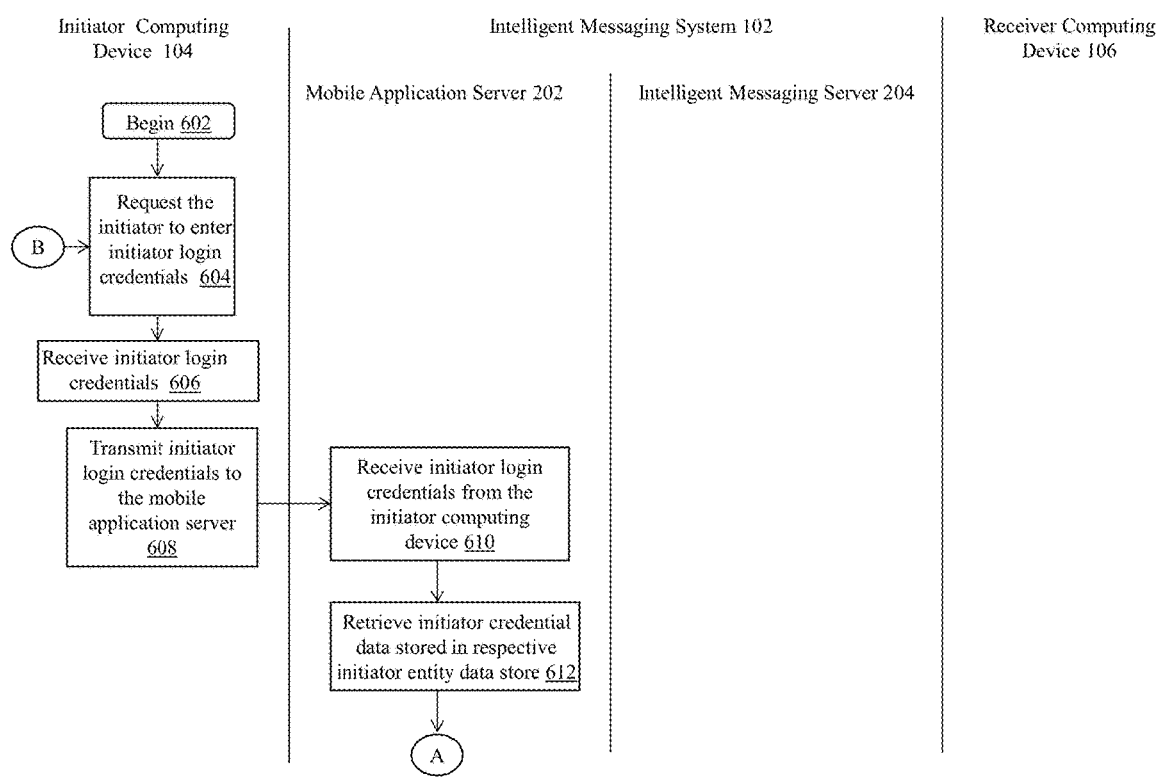
FIGS. 8A-8G (collectively 'FIG. 8') are flow charts that illustrates another example operation of the electronic message communications operation of the intelligent messaging system where an account from multiple accounts is selected by the system, in accordance with example embodiments of the present disclosure.
Figure 8B:
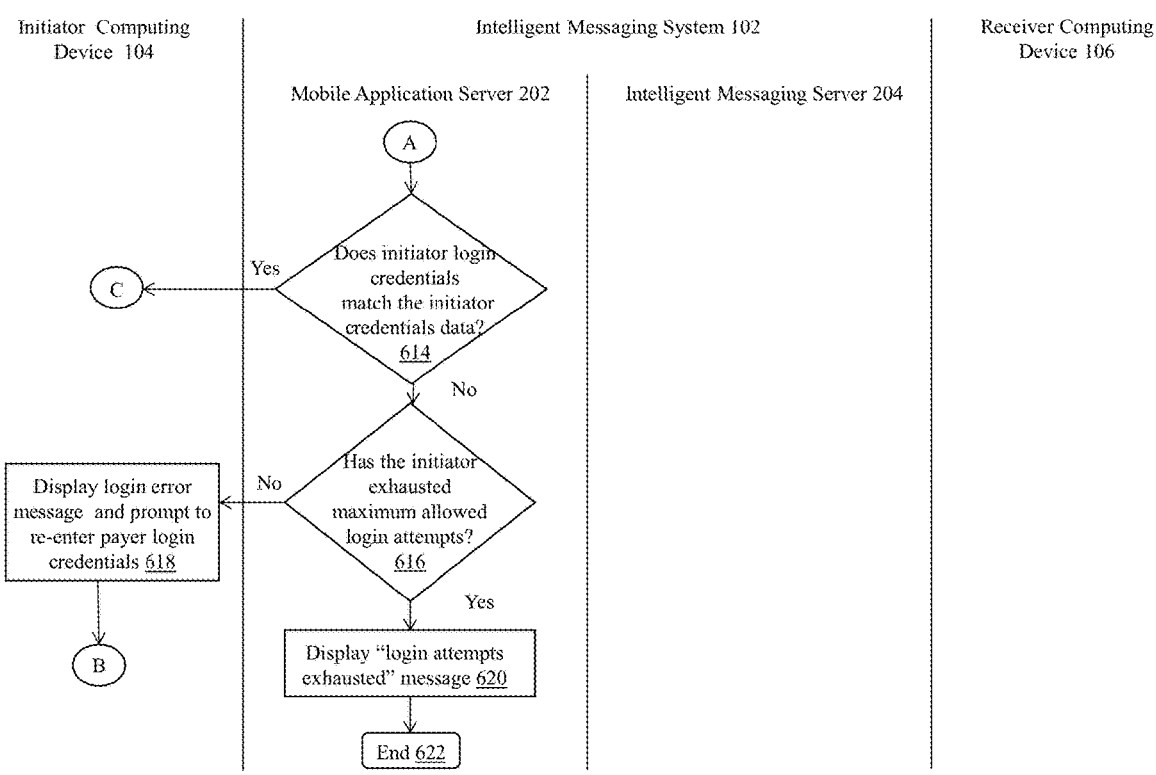
Figure 8C:
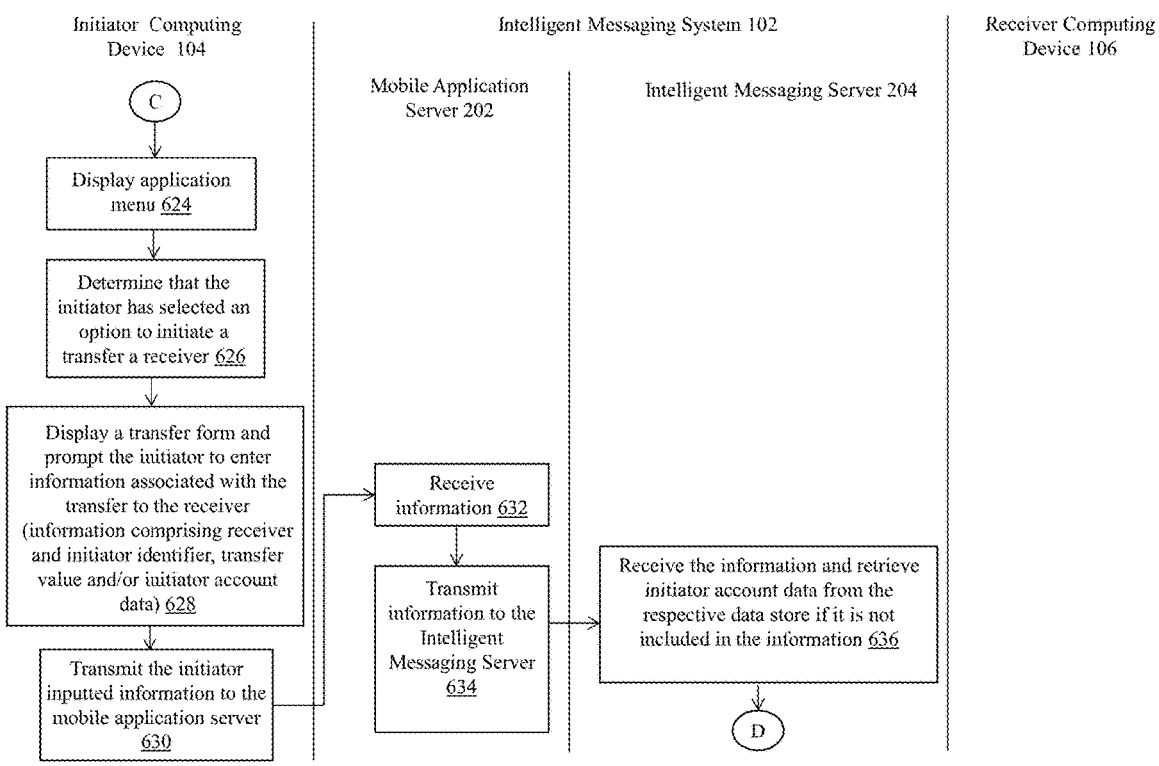
Figure 8D:
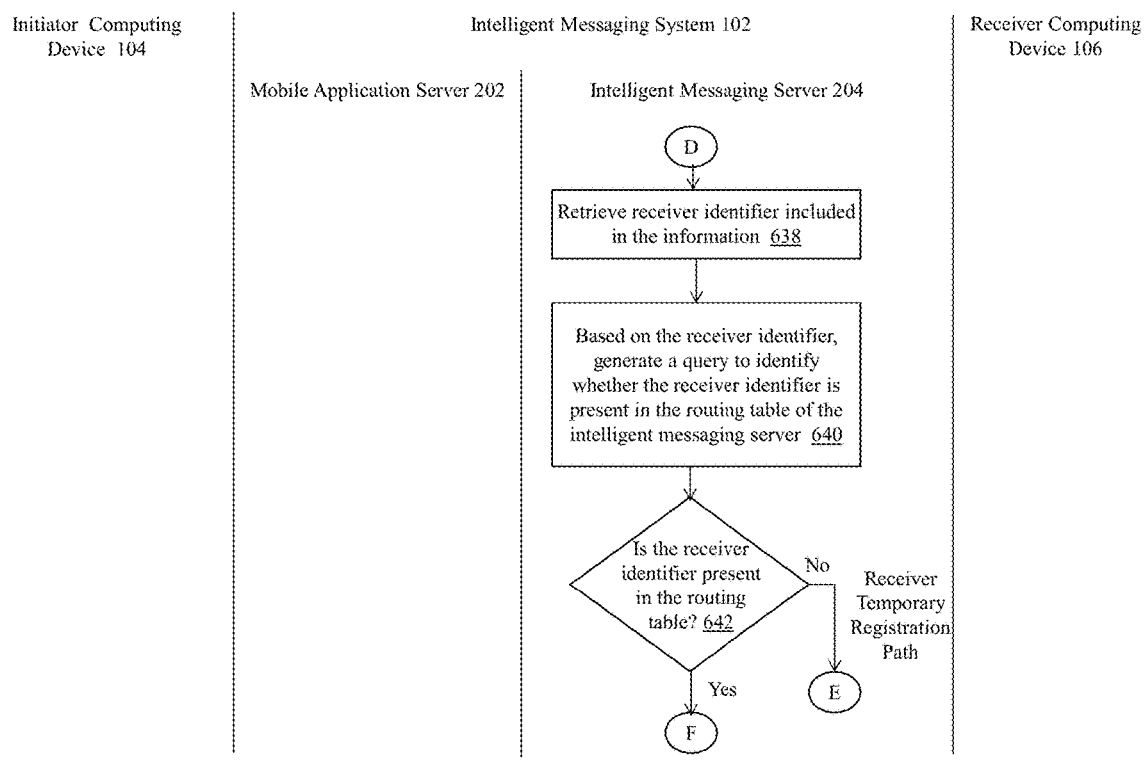
Figure 8E:
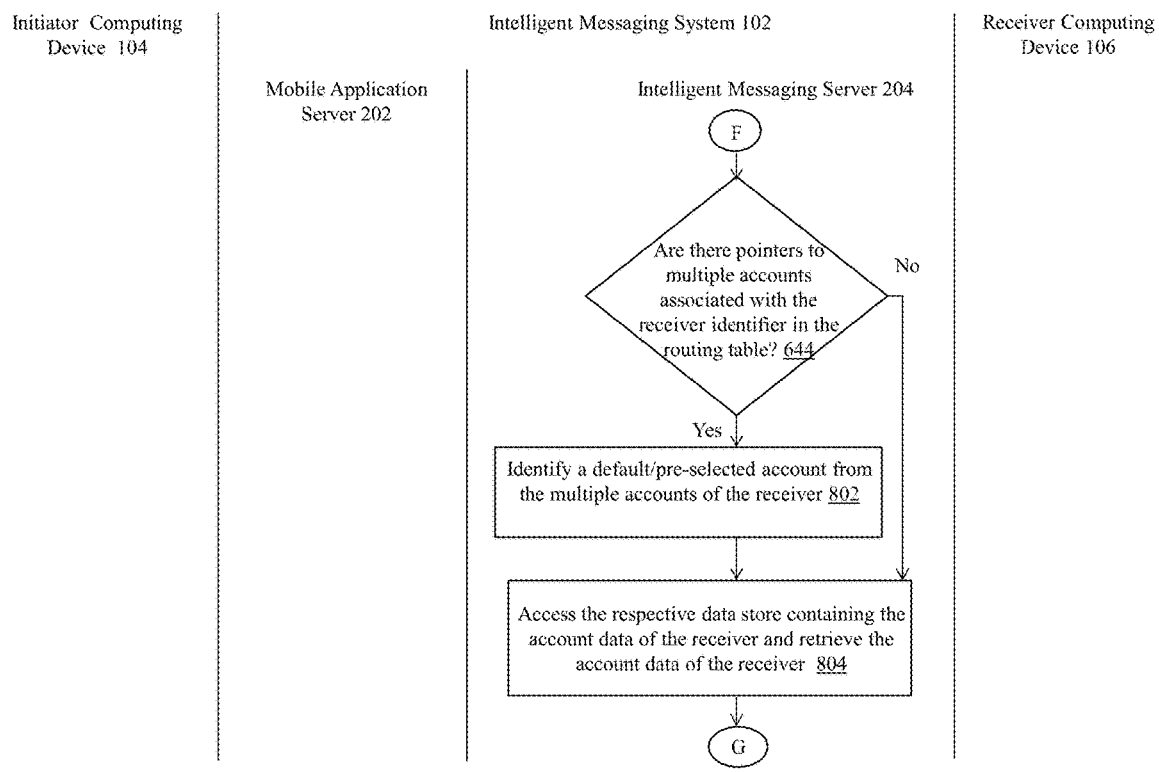
Figure 8F:
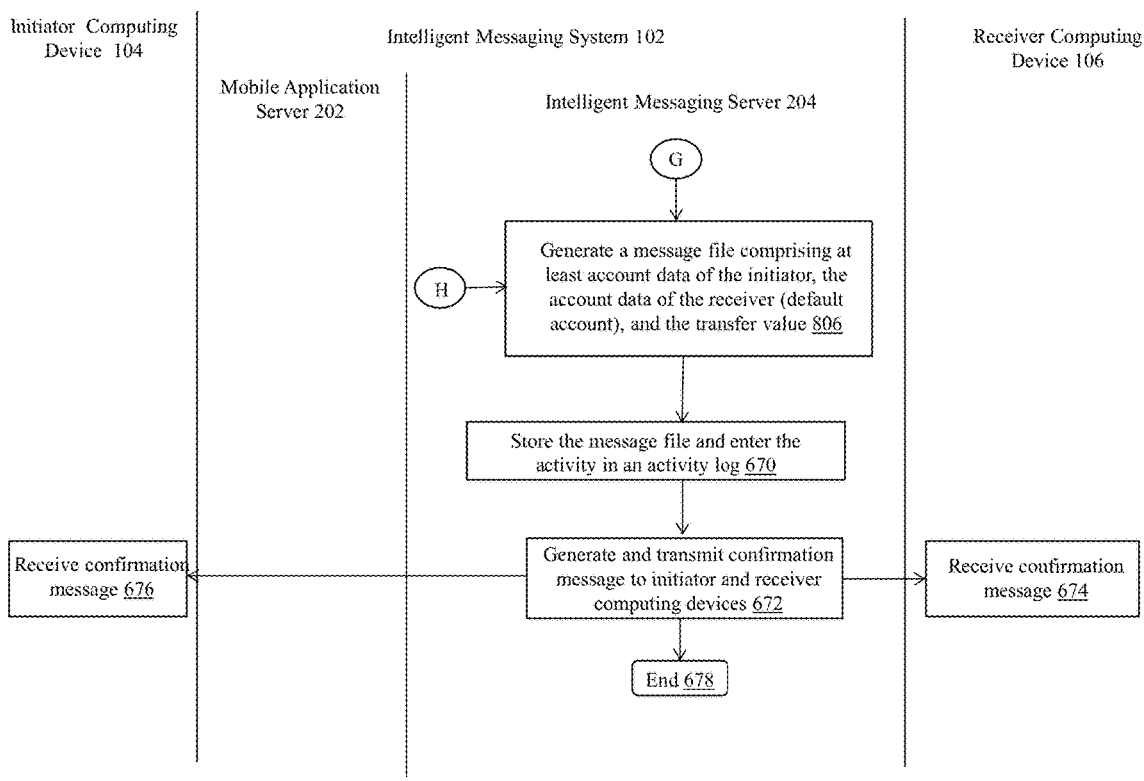
Figure 8G:
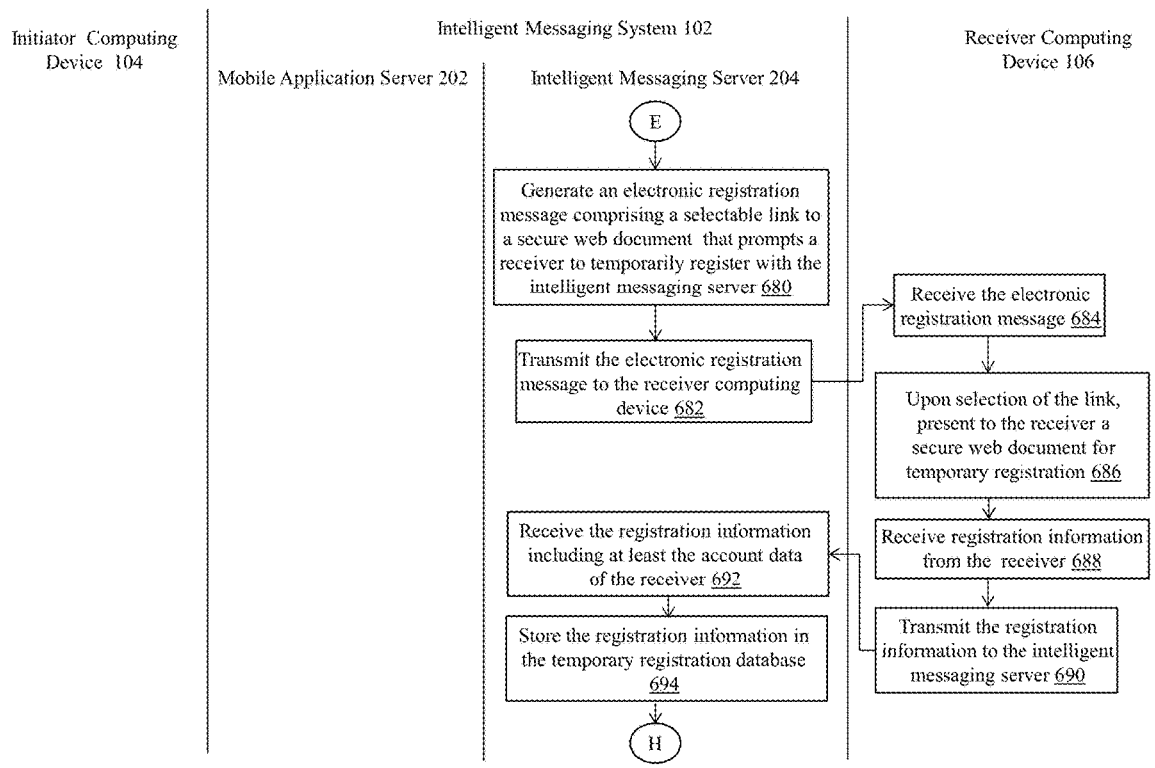

Turning to FIG. 5, this figure is a flow chart that illustrates an initial set-up/registration process of the intelligent messaging system illustrated in FIG. 1, in accordance with example embodiments of the present disclosure. However, the registration process of FIG. 5 is not the same as a temporary registration of the receiver 116 with the intelligent messaging server which will be described in greater detail below in association with FIGS. 6, 8, and 9C.

As described earlier, any user that wants to receive services offered by the intelligent messaging system 102 may have to register one or more payment accounts of the user with the intelligent messaging system 102. In particular, the user may register the user's payment accounts with the intelligent messaging system 102 through the respective financial entities associated with the user's payment accounts. Accordingly, the user may provide the financial entities with a consent to share/release their private information, e.g., payment account information and/or other public or private information to the intelligent messaging system 102.

Once the user expresses interest to receive services offered by the intelligent messaging system 102 and provides consent to the financial entities to share/release payment account information associated with their payment accounts to the intelligent messaging system 102, the initial set-up/registration process begins at operation 502 and proceeds to operation 504. In operation 504, the intelligent messaging server 204 may receive registration data files and/or a payment account data files from the financial entities associated with the user's payment account and/or their respective directories (108a,c) associated with the financial entities.

Depending upon the data file that is received, the intelligent messaging server 204 may choose to either update a routing table or update both the routing table and a multi-tenant database 108b. For example, in operation 506, the intelligent messaging server 204 determines whether the received data file is a registration data file or a payment account information file. If the received data file is the registration data file, then the intelligent messaging server 204 proceeds to operation 508, where the routing table in the routing table database 424 is updated with the information present in the registration data file, i.e., at least the unique identifier of the user and location information of a directory that maintains payment account information associated with the user's payment account. If the user has multiple payment accounts, then, a data record associated with the user in the routing table may include directory location information of directories associated with each of the multiple payment accounts.

As described earlier, the multiple payment accounts of a user may be linked together based on the unique identifier of the user, provided that the user consistently used the same unique identifier for registration of the multiple payment accounts. Alternatively, if the user has used multiple different unique identifiers across multiple payment accounts, the intelligent messaging server 204 may provide an option for the user (through the intelligent messaging application) to manually link the multiple payment accounts. In either case, the routing table identifies and records multiple payment accounts associated with the same user.

Returning to operation 506, if the received data file is the payment account data file, the intelligent messaging server 204 proceeds to operation 510, where the payment account information in the payment account data file is added to/stored in the multi-tenant directory 108b. In particular, in operation 512, the intelligent messaging server 204 may extract the payment account information from the payment account file, transform the payment account information to a compatible format, and load the payment account information into the multi-tenant directory 108b. Responsive to loading the payment account information into the multi-tenant directory 108b, the intelligent messaging server 204 proceeds to operation 512 where the routing table in the routing table database 424 is updated with information of user's whose payment account information is loaded into the multi-tenant database 108b. For example, in operation 514, the routing table is updated to include the unique identifier of the user and the multi-tenant directory location since the payment account information of the user is stored in the multi-tenant directory 108b.

In addition to updating the routing table, in operations 508 and 512, the intelligent messaging server 204 may add additional information to the routing table database 424, such as, inter alia, the user and/or financial entity preference regarding the default payment account selection, alias of each registered payment account of the user, and/or registration status, rights, and privileges of the user.

Once the routing table and/or the multi-tenant directory 108b is updated during the initial set-up/registration process, in operation 514, the intelligent messaging server 204 may further update the routing table and/or the multi-tenant directory 108b during the operation of the intelligent messaging system 102. The subsequent updates that occur after the initial set-up/registration process occur either periodically or as and when updated information is received from the trusted directories 108a and/or the third party directories 108c. In one example, if a financial entity has a new customer or if an existing non-registered customer of the financial entity expresses interest to receive services offered by the intelligent messaging system 102, the respective directories (108a,c) associated with the financial entity may forward the a new registration data file and/or payment account data file associated with the new customer or said existing customer. In another example, he directories associated with the financial entity may forward the a new registration data file and/or payment account data file associated with the customers that are to be removed.

Upon receiving the new registration data file and/or payment account data file, in operation 514, the intelligent messaging server 204 may update the routing table and/or the multi-tenant directory 108b to add new users or delete existing users. Further, in operation 514, if the intelligent messaging server 204 determines that a user has not been using the services offered by the intelligent messaging system 102 for a threshold period of time, user information may be moved to a backup storage database.

ii. Payment Transaction Request Operation

Turning to FIG. 6, this figure is a flow chart that illustrates an example electronic payment transaction request operation of the intelligent messaging system, in accordance with example embodiments of the present disclosure. In particular, FIGS. 6A and 6B illustrates a user authentication operation, FIGS. 6C-6G illustrates a multiple account selection operation, and FIGS. 6C-6D and 611 illustrates a temporary registration operation of the intelligent messaging system. Further, FIG. 6 may be described making forward references to FIGS. 9-10 as may be appropriate or helpful.

Figure 9A:
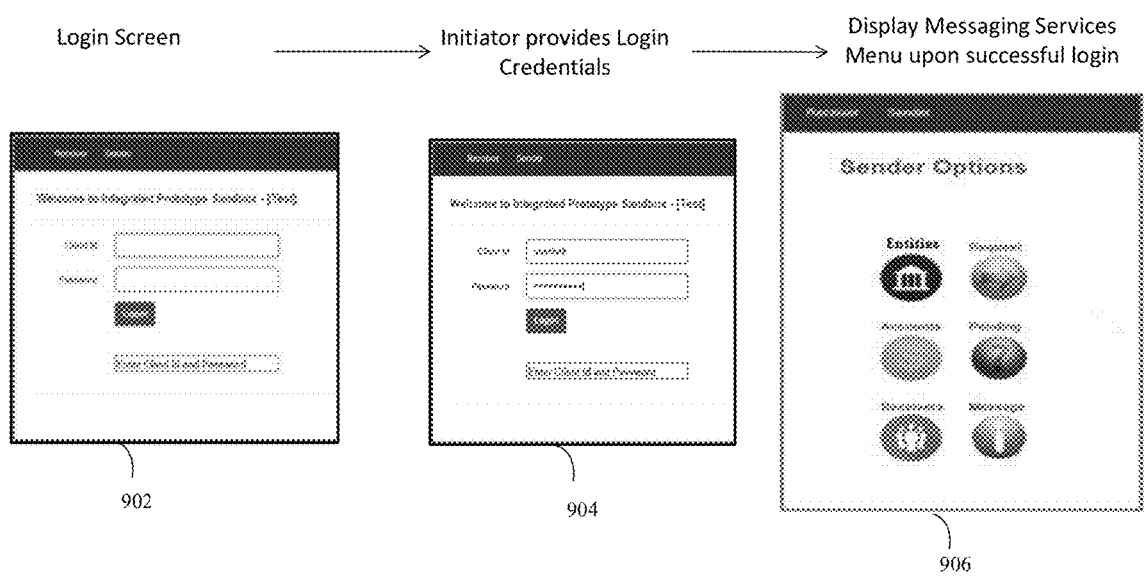
FIGS. 9A-9D (collectively 'FIG. 9') illustrate example user interfaces associated with the electronic message communications operation of the intelligent messaging system, in accordance with example embodiments of the present disclosure.
Figure 9B:
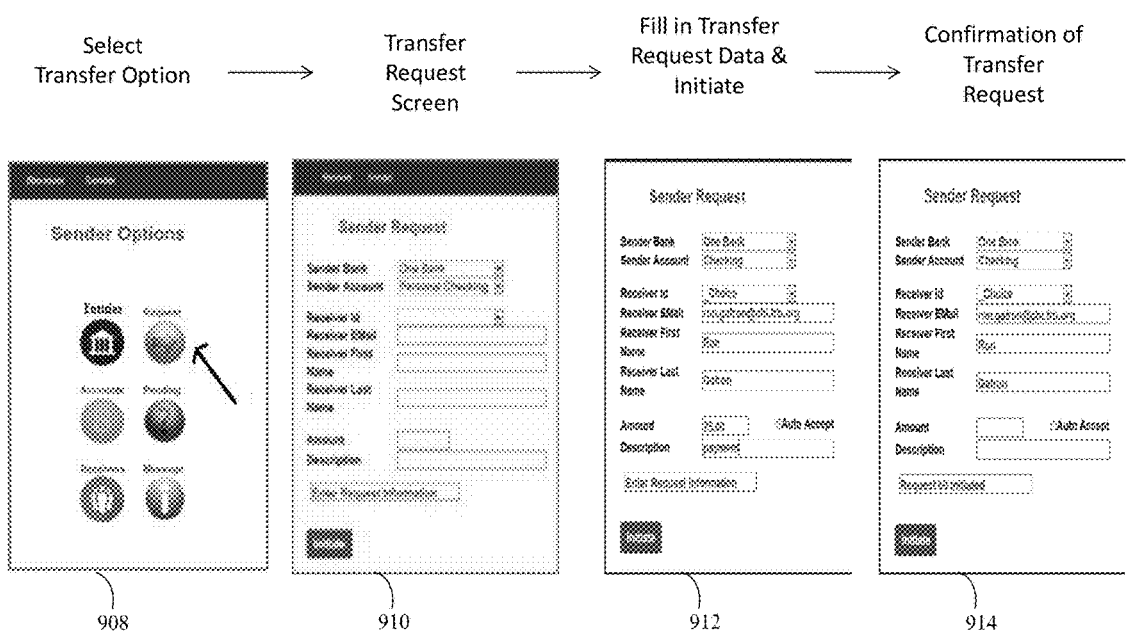
Figure 9C:
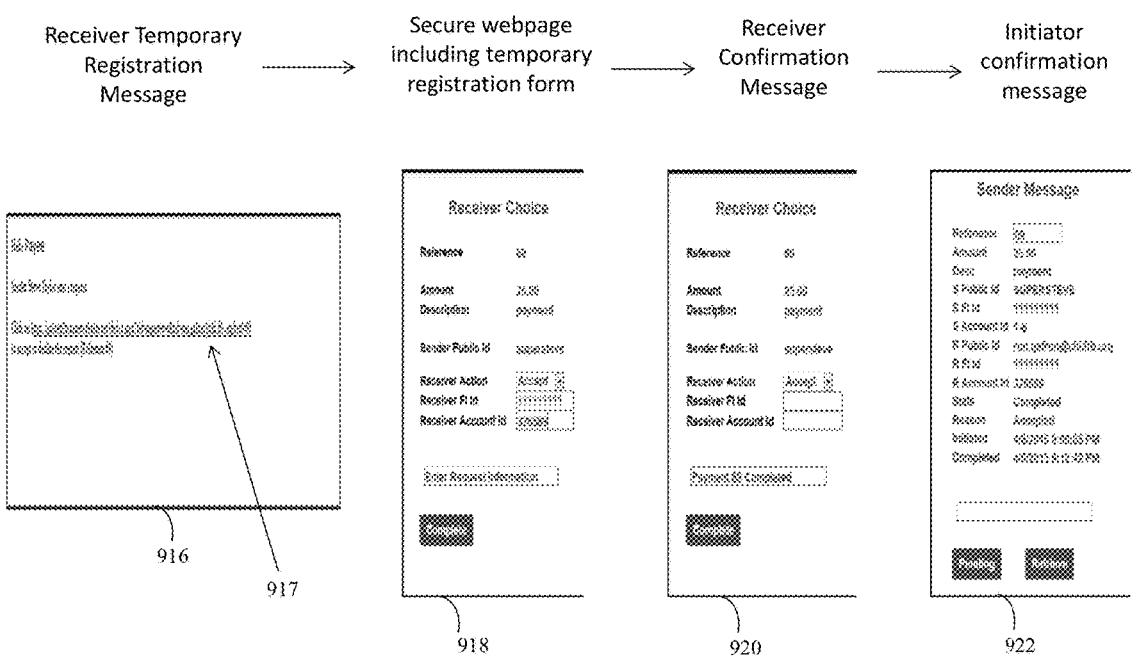
Figure 9D:
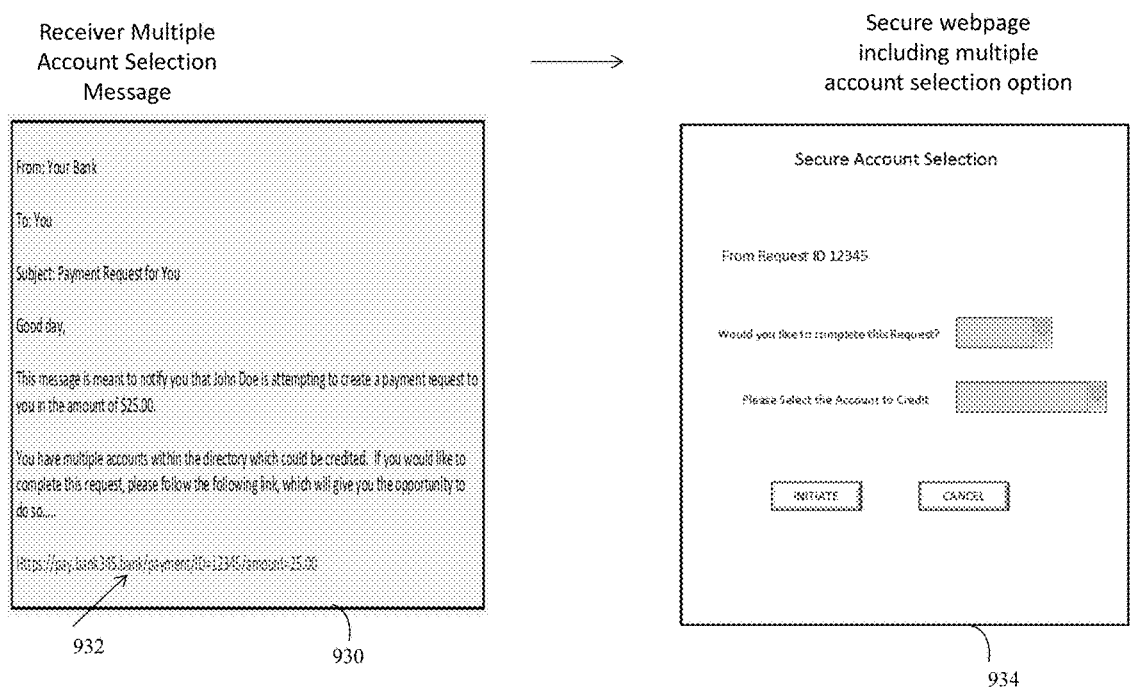
Figure 10:
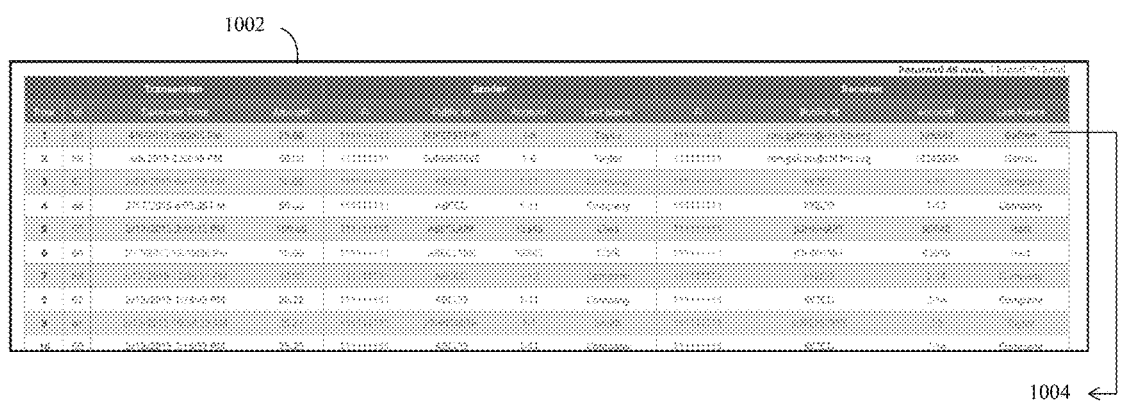
FIG. 10 illustrates an example electronic activity log, in accordance with example embodiments of the present disclosure.

FIG. 9 illustrates example user interfaces associated with the electronic payment transfer operation of the intelligent messaging system, in accordance with example embodiments of the present disclosure; and FIG. 10 illustrates an example payment transfer activity log, in accordance with example embodiments of the present disclosure. One of ordinary skill in the art can understand and appreciate that the example user interfaces and activity log shown in FIGS. 9-10 are not limiting. That is, the user interfaces and/or the activity log may vary, such as more features may be added to the user interfaces, some features may be deleted, the look and feel of the user interfaces may be changed, and so on, without departing from a broader scope of the present disclosure.

In one example embodiment, an initiator 114 may be registered user of the intelligent messaging system 102. Further, the initiator 114 may have an initiator computing device 104 that includes an stand-alone intelligent messaging application or a banking application that is integrated with the intelligent messaging application as described earlier.

a) Initiator Authentication Operation

Referring to FIGS. 6 and 9-10, in operation 602, when the intelligent messaging application is initially executed, a client instance of the intelligent messaging system 102 may be invoked and a user authentication page (web page) may be presented to the initiator 114 via the initiator computing device 104. For example, a login screen 902 may be presented to the initiator 114 as illustrated in FIG. 9A. In operation 604, the initiator computing device 104 may prompt the initiator 114 to input login credentials associated with the initiator (herein 'initiator login credentials') into the one or more data entry fields of the user authentication page. Further, in operation 604, the initiator 114 may input the initiator login credentials, for example, as illustrated in user interface screen 904 of the FIG. 9A. Example login credentials may include, but are not limited to, username, password, biometric scan values (fingerprint, voice, retina scan, etc.), gestures, etc. In other words, any appropriate authentication mechanisms may be used without departing from the broader scope of the present disclosure.

Responsive to the initiator 114 inputting the initiator login credentials, in operations 606-610, the initiator computer device 104 may transmit the inputted initiator login credentials to the mobile application server 202. Upon receiving the initiator login credentials, in operation 612, the mobile application server 202 may retrieve corresponding initiator credential data that is stored in a data store of the initiator bank 112 and/or a data store associated with the intelligent messaging server 204 depending on whether the services offered by the intelligent messaging system 102 are made available through the initiator bank 112 or through a stand-alone application.

In either case, once the initiator data credential is retrieved, in operation 614, the mobile application server 202 may authenticate the initiator 112 by comparing the initiator login credentials with the initiator credential data. If the initiator login credentials does not match the initiator credential data, the initiator authentication fails. Responsive to an authentication failure, in operation 416, the mobile application server 202 may determine if a maximum number of authentication attempts has been reached. Upon determining that the maximum number of authentication attempts has been reached, in operation 620, the mobile application server 202 may generate and transmit a message to the initiator computing device 104 indicating that the initiator 114 has exhausted the maximum number of authentication attempts that is allowed to the initiator 114. Further, process ends in operation 622. However, if the maximum number of authentication attempts has not been exhausted, in operation 618, the mobile application server 202 may generate and transmit a message to the initiator computing device 104 that the authentication has failed and may request the initiator 114 to re-enter the initiator login credentials.

b) Receiver Multiple Account Selection Operation

Returning to operation 614, if the initiator login credentials match the initiator credential data, the initiator authentication is successful. Responsive to a successful authentication, the mobile application server 202 may operate in concert with the intelligent messaging server 204 to present an intelligent messaging services menu to the initiator 114 via the initiator computing device 104. For example, an example intelligent messaging services menu screen 906 may be presented to the initiator 114 as illustrated in FIG. 9A. Even though FIG. 9A illustrates the example intelligent messaging services menu screen 906 as being embedded within a banking application of the initiator bank (XYZ Bank), one of ordinary skill in the art can understand and appreciate that the intelligent messaging services menu screen 906 may be presented in any other appropriate format, e.g., stand-along format, without departing from a broader scope of the present disclosure.

Responsive to presenting the intelligent messaging services menu to the initiator 114, in operation 626, the initiator computing device 104 may determine that the initiator 114 has selected an option to initiate a payment transaction with a receiver 116, as illustrated in the example user interface screen 908 of FIG. 9B. Responsive to determining that the initiator 114 has selected the option to initiate the payment transaction, in operation 628, the initiator computing device 104 may operate in concert with the intelligent messaging system 102 to present (e.g., display) a payment request form to the initiator 114 and prompt the initiator 114 to input payment information required to initiate the payment transaction with receiver 116. For example, as illustrated in FIG. 9B, a payment request screen 910 including an example payment request form may be presented to the initiator 114. In one example, the payment information may include a payment amount and a unique identifier of the receiver (hereinafter 'receiver identifier'), and an initiator identifier. In another example, the payment information may additionally include payment account number of the initiator's payment account, a short message to the receiver (e.g., reason for the payment transfer, invoice number, etc.), and so on. As illustrated in the example payment request screen 910, the payment request form may include a data field that allows the initiator 114 to provide a description associated with the payment. Further, if the initiator 114 has multiple payment accounts registered with the intelligent messaging system 102, the payment request form may allow the initiator 114 to select one of the payment accounts as illustrated by the drop down menu in the example payment request screen 910 of FIG. 9B.

Once the initiator 114 fills the payment request form as illustrated by user interface screen 912 in FIG. 9B and confirms a submission of the payment request form, in operation 630, the initiator computing device 108 may transmit the payment information to the mobile application server 202. Responsive to receiving the payment information, in operation 632, the mobile application server 202 may format the payment information into an electronic payment request file. Further, in operation 634, the mobile application server 202 may transmit the electronic payment request file to the intelligent messaging server 204.

Upon receiving the electronic payment request file, in operation 636, the intelligent messaging server 204 may determine if the initiator's payment account number is present in the electronic payment request file. If the initiator's payment account number is not present in the electronic payment request file, the intelligent messaging server 204 may use the initiator identifier from the electronic payment request file to retrieve the initiator's payment account number from a respective directory that maintains the payment account information of the initiator's payment account. For example, the intelligent messaging server 204 may query the trusted directory 108a of the initiator bank 112 to retrieve the payment account number of the initiator's payment account in the initiator bank 112. However, if the initiator's payment account number is present in the electronic payment request file, the intelligent messaging server 204 may proceed to operation 638.

In some embodiments, in operation 636, the intelligent messaging server 204 may also perform an edit check, i.e., the intelligent messaging server 204 may check the status of the initiator's payment account, data consistency of the payment information, errors in the payment information, etc.

Once the initiator's payment account number is retrieved and/or the edit check is successfully completed, in operation 638-642, the intelligent messaging server 204 may retrieve the receiver identifier from the electronic payment request message and determine whether the receiver identifier is known to the intelligent messaging system 102. That is, the intelligent messaging server 204 may determine if the receiver identifier is present in the routing table of the intelligent messaging server 204. In particular, in operation 642, the intelligent messaging server 204 compares the receiver identifier against the list of unique identifiers of registered users present in the routing table. If the receiver identifier matches a unique identifier of a registered user, then, the intelligent messaging server 204 determines that the receiver 116 is a registered user of the intelligent messaging system. Responsively, in operation 644, the intelligent messaging server 204 retrieves, from the routing table, directory location information associated with the unique identifier of the registered user that matches the receiver identifier. Further, based on the retrieved directory location information, in operation 644, the intelligent messaging server 204 may determine whether the receiver has multiple payment accounts. In particular, if there is more than one directory location information, each corresponding to a different directory or a different repository within the same directory, the intelligent messaging server 204 may determine that the receiver 116 has multiple payment accounts.

Responsive to determining that the receiver 116 has multiple payment accounts, in operation 646, the intelligent messaging server 204 may set a multiple accounts flag (e.g., flip a bit from 0 to 1 or 1 to 0). Once the multiple accounts flag has been set, the intelligent messaging server 204 may proceed to operation 648. Alternatively, the intelligent messaging server 204 may proceed to operation 648 if in operation 644, the intelligent messaging server 204 determines that the receiver 116 only has a single payment account.

In operation 648, the intelligent messaging server 204 may generate and transmit a payment account information query to each directory 108*a-c* identified by the directory location information. Further, in operation 648, the intelligent messaging server 204 may receive, from the directories 108*a-c*, payment account information associated with each payment account of the receiver. In one example, the payment account information received in response to the payment account information query may include, inter alia, a payment account number of the receiver's respective payment account and an alias representative of the receiver's respective payment account. In another example, the payment account information received in response to the payment account information query may additionally include a name of the financial entity associated with the receiver's respective payment account, a routing number, a SWIFT number, etc.

Once the payment account information associated with each payment account of the receiver is received, in operation 650, the intelligent messaging server 204 may determine if the multiple accounts flag is set. In certain example embodiments, if payment account information of the receiver's multiple payment accounts is located in one directory, the multiple accounts flag may not be set in operation 646. For example, a multi-tenant directory 108*b* may have ten databases, i.e., databases 1-10. Further, in said example, a receiver 116 may have two payment accounts and payment account information associated with both the payment accounts may be stored in database 1 of the multi-tenant directory 108*a*. Accordingly, in said example, the routing table of the intelligent messaging server 204 may only include the IP address (location information) of database 1. That is, there is only directory location information for both the payment accounts of the receiver. In said example, since there is only one directory location information, in operation 646, the intelligent messaging server 204 may not recognize that the receiver has multiple payment accounts and hence, may not set the multiple accounts flag. However, in said example when the intelligent messaging server 204 queries database 1 for payment account information of the receiver 116, the intelligent messaging server 204 may receive payment account information associated with two accounts. It is at this point, i.e., in operation 648, that the intelligent messaging server 204 may recognize that the receiver has multiple accounts and subsequently, the intelligent messaging server 204 may set the multiple accounts flag.

Upon determining that the multiple accounts flag is set, the intelligent messaging server 204 proceeds to operation 652. In operation 652, the intelligent messaging server 204 generates an electronic selection message that includes a pointer (web link, hyperlink) to a secure multiple account selection web document. Responsive to generating the electronic selection message, in operation 654, the intelligent messaging server 204 may transmit the electronic selection message to the receiver computing device 106 based on the receiver identifier. In operations 656 and 658, the receiver computing device 106 may receive and present the electronic selection message to the receiver 116. For example, the receiver computing device 106 may present an example electronic selection message screen 930 with an example link 932 to the receiver 116 as illustrated in FIG. 9D. The receiver 116 may select the link in the electronic selection message. Responsively, the receiver 116 may be directed to the secure electronic account selection web document that includes aliases of the receiver's multiple payment accounts. Further, in operation 660, the receiver computing device 106 may prompt the receiver 116 to select one of the multiple payment accounts. For example, upon selecting the example link 932 in screen 930, the receiver 116 may be directed to an example secure multiple account selection webpage screen 934 that prompts and allows the receiver 116 to select an account (e.g., drop down menu) as illustrated in FIG. 9D. Responsive to the receiver selecting one of the multiple payment accounts, in operations 662 and 664, the receiver computing device 106 may transmit a signal that identifies the payment account selected by the receiver 116.

In certain example embodiments, prior to generating the electronic selection message, in operation 650, the intelligent messaging server 204 may determine if there exists preference information that identifies a default payment account (provided by the receiver 116, the initiator bank 112, and/or the receiver bank 120 during the initial set-up/registration process). Upon determining that preference information that identifies a default payment account exists, the intelligent messaging server 204 proceeds to operation 802 that is described in greater detail below in association with FIG. 8. However, if no such preference information exists, the intelligent messaging server 204 proceeds to operation 652 to generate the electronic selection message as described above.

In operation 666, once the receiver 116 has selected a payment account from the multiple payment accounts, the intelligent messaging server 204 may receive the signal that identifies the payment account selected by the receiver 116. Responsive to identifying the selected payment account, in operation 668, the intelligent messaging server may generate a payment request record that includes at least the payment account number of the payment account selected by the receiver, the payment account number of the initiator's payment account, and the payment amount. Alternatively, the intelligent messaging server 204 may proceed to operation 668 from operation 650 if the intelligent messaging server 204 determines that the multiple accounts flag is not set. That is, if the receiver 116 has a single payment account, the intelligent messaging server 204 may skip the electronic selection message generation process and proceed to operation 668 where the payment request record is generated.

Responsive to generating the payment request record, the intelligent messaging server 204 may add the payment request record to a payment message file that may include a plurality of payment request records. Then, in operation 670, the intelligent messaging server 204 stores the payment message file in the message file database 426. Additionally, in operation 670, the intelligent messaging server 204 stores information associated with the payment request in an activity log 1002 within the activity log database 428 as illustrated in FIG. 10. The activity log 1002 may include information associated with a plurality of payment requests, e.g., payment request 1004, that are recorded for logistics and analytics purposes.

Once the payment request record and/or the payment message file is generated, in operations 672-676, the intelligent messaging server 204 may operate in concert with the mobile application server 202 to generate and transmit confirmation messages to the initiator computing device 104 and/or the receiver computing device 106 for presentation to the initiator 114 and/or the receiver 116. The confirmation messages may inform the initiator 114 and/or the receiver 116 of successful creation of a pending payment request. Responsively, the payment request generation operation ends at operation 678. For example, an example confirmation message screen 922 may be presented to the initiator 114 and an example confirmation message screen 920 may be presented to the receiver 116 as illustrated in FIG. 9C.

In some example embodiments, in addition to providing an option to the receiver for selecting one payment account from the multiple payment accounts of the receiver to receive a payment from an initiator, in some embodiments, the intelligent messaging server may also provide another option to split the payment into more than one payment account of the multiple payment accounts. For example, John Doe has four payment accounts, two associated with Financial institution A, one associated with financial institution C, and another one associated with financial institution B. In said example, an initiator, Jane Roe may initiate a payment transfer of $100 to John Doe. Continuing with the example, the intelligent messaging server 102 may provide John Doe an option to receive $40 to one of the financial institution A accounts, $50 to the financial institution C account, and $10 to the financial institution B account. That is, in some example embodiments, the intelligent messaging server 204 may allow a receiver 116 to split one payment and receive portions of the one payment into multiple payment accounts of the receiver as desired by the receiver. In said example embodiment, multiple payment request records may be made for one payment transaction request based on how the payment is split between the multiple payment accounts. In the above example, three payment request records may be created for one $100 payment transaction request of Jane Roe, one payment request record for the $40 that is to be sent to the financial institution A account, one payment request record for the $50 that is to be sent to the financial institution C account, and one payment request record for the $10 that is to be sent to the financial institution B account.

Similarly, in some embodiments, the intelligent messaging server may provide an option to the initiator 114 to fund the payment amount of one payment transaction to the receiver 116 from more than one payment accounts of a same financial entity or multiple financial entities. Said option may be provided to the initiator 114 in the payment request form (e.g., form 910 as in FIG. 9B) that is presented to the initiator 114 responsive to selecting an option to initiate a payment transaction. For example, an initiator, Jane Roe, may have four payment accounts, two associated with Financial institution A, one associated with financial institution C, and another one associated with financial institution B. In said example, Jane Roe may decide to fund $100 that is to be transferred to a receiver, John Doe, in one payment transaction using more than one of the four payment accounts. That is, Jane Roe may fund the $100 in following example format: $40 from one of the financial institution A accounts, $50 from the financial institution C account, and $10 from the financial institution B account. In said example embodiment, the payment request record may include the payment account identifier of the respective financial institution A account, the payment account identifier of the financial institution C account, a payment account identifier of the financial institution B account, respective payment amounts that is to be debited from each of the payment accounts, and a payment account identifier of the receiver.

c) Temporary Registration Operation

Referring back to operation 642, if the receiver identifier does not match a unique identifier of a registered user in the routing table, then, the intelligent messaging server 204 determines that the receiver 116 is an unregistered user. That is, the intelligent messaging server 204 does not have any information associated with the receiver (e.g., location information of directory databases that include payment account information of the receiver), except for the receiver identifier provided by the initiator 114 in the electronic payment request file.

Responsively, the intelligent messaging server 204 proceeds to operation 680, where the intelligent messaging server 204 generates an electronic registration message that includes a pointer (web link, hyperlink) to a secure temporary registration document. Responsive to generating the electronic registration message, in operation 682, the intelligent messaging server 204 may use the receiver identifier to transmit the electronic registration message to the receiver 116 and/or the receiver computing device 106 either by itself or through the mobile application server 202. In operation 684, the receiver computing device 106 may receive and present the electronic registration message to the receiver 116. For example, the receiver computing device 106 may present an example electronic registration message screen 916 with an example link 917 to the receiver 116 as illustrated in FIG. 9C. Responsive to the receiver 116 selecting the link in the electronic registration message, in operation 686, the receiver 116 may be directed to a secure temporary registration web document via the receiver computing device 106. The secure temporary registration web document may include a temporary registration form that prompts the receiver 116 to provide temporary registration information. For example, upon selecting the example link 917 in screen 916, the receiver 116 may be directed to an example secure temporary registration webpage screen 918 with a temporary registration form as illustrated in FIG. 9C.

Responsive to the receiver 116 filling the temporary registration form, in operations 688-690, the receiver computing device 106 may receive and transmit, to the intelligent messaging server 204, temporary registration information inputted by the receiver 116 in the temporary registration form. As described above, the temporary registration information may include at least a payment account number associated with a payment account of the receiver 116. However, the temporary registration information may include additional information without departing from a broader scope of the present disclosure.

In operation 692, the intelligent messaging server 204 may receive the temporary registration information including at least the payment account number associated with a payment account of the receiver 116. Responsively, in operation 694, the intelligent messaging server 204 may store the temporary registration information in the temporary registration database 430.

Once the temporary registration message has been stored in the temporary registration database 430, the intelligent messaging server 204 proceeds to operation 668 where the intelligent messaging server 204 may generate a payment request record that includes at least the payment account number of the receiver from the temporary registration information, the payment account number of the initiator's payment account, and the payment amount.

Responsive to generating the payment request record, in operations 670-676, the intelligent messaging server 204 may add the payment request record to a payment message file, store the payment message file in the message file database 426, store information associated with the payment transaction in the activity log database 428, and generate and transmit confirmation messages to the initiator computing device 104 and/or the receiver computing device 106 for presentation to the initiator 114 and/or the receiver 116. The confirmation messages may inform the initiator 114 and/or the receiver 116 of successful creation of a pending payment request. Responsively, the payment request generation operation ends at operation 678.

Even though FIG. 6 illustrates the confirmation messages, the electronic registration messages, and/or electronic selection messages as being sent to the initiator computing device 104 and/or the receiver computing device 106, one of ordinary skill in the art can understand and appreciate that in some embodiments, said messages may be sent to a server that may be accessed using the initiator computing device 104 and/or the receiver computing device 106 without departing from a broader scope of the present disclosure. Further, even though FIG. 6 illustrates the above mentioned messages as being sent by the intelligent messaging server 204, one of ordinary skill in the art can understand and appreciate that in some embodiments, the intelligent messaging server 204 sends one or more of said messages to the initiator 114 and/or receiver 116 through the mobile application server 202.

Further, responsive to storing the payment message files in the message file database 426, the intelligent messaging server 204 may transmit the payment message files to the payment network 122 for actual transfer of payments from the initiator 114 to the receiver 116 via their respective banks.

Furthermore, the temporary registration may allow the receiver 116 to use one or more services offered by the intelligent messaging system 102 for one-time or a limited number of times as determined by the intelligent messaging server and/or the receiver bank 120. If a receiver 116 is temporarily registered, the intelligent messaging server 204 may summarize and transmit the temporary registration information of the receiver 116 to the receiver bank 120 informing the receiver bank 120 that the receiver 116 has used the services of the intelligent messaging system 102 at least once. Responsively, the receiver bank 120 may or may not decide to fully register the receiver's payment account with the intelligent messaging system. Further, the receiver bank 120 may promote other customers of the receiver bank 120 to register with the intelligent messaging system 102 to receive services offered by the intelligent messaging system 102. Alternatively, the receiver bank 120 may already be a registered with the intelligent messaging system 102, i.e., one or more customers of the receiver bank 120, other than the current receiver 116, may be fully registered with the intelligent messaging system 102. In said embodiment where the receiver bank 120 is already registered with the intelligent messaging system 102, upon receiving the summaries temporary registration information of the receiver 116 from the intelligent messaging server 204, the receiver bank 120 may decide to or decide against fully registering the receiver 116 with the intelligent messaging system 102.

Once the summarized temporary registration information of the receiver 116 is sent to the receiver bank 120, the intelligent messaging server 204 may delete the temporary registration information of the receiver 116 from the temporary registration database 430. That is, the next time an initiator 114 initiates a payment transaction with the receiver 116, the receiver 116 has to once again provide temporary registration information to the intelligent messaging server 106 in response to an electronic registration message. Similarly, in some example embodiments, the initiator 114 may be allowed to temporarily register with the intelligent messaging system 102 without departing from a broader scope of the present disclosure.

Turning to FIG. 8, this figure is a flow chart that illustrates another example operation of the electronic payment transaction operation of the intelligent messaging system where a payment account from multiple payment accounts is selected by the system to transaction a payment to a receiver, in accordance with example embodiments of the present disclosure. In particular, the flow chart illustrated in FIG. 8 is substantially similar to the flow chart illustrated in FIG. 6, except for operations 802-806 which will be described in greater detail below. That is, the remaining operations of FIG. 8, i.e., operations 602-644 and operations 670-678 that are substantially similar to that of FIG. 6 will not be described herein to avoid repetition and for the sake of brevity.

Responsive to determining that the receiver 116 has multiple payment accounts, in operation 802, the intelligent messaging server 204 may identify and select one of the multiple payment accounts as a default payment account for advancing the payment transaction request from the initiator 114. In one example embodiment, the intelligent messaging server may make the selection of the default payment account based on a preference of the receiver 116. However, the preference of the receiver 116 is not received in response to an electronic selection message that is sent to the receiver 116 as described above in FIG. 6. Instead, in the operation of FIG. 8, the receiver 116 may provide his/her preference during an initial set-up/registration of the receiver's payment accounts with the intelligent messaging system 102 prior to the payment transaction request from the initiator 114. For example, a receiver 116 may register four payment accounts, accounts_1-4 of the receiver 116 with the intelligent messaging system 102 during the initial set-up/registration process. In said example, during the initial set-up/registration process, the receiver 116 may provide a preference of the receiver 116 that instructs the intelligent messaging server 204 to select account_3 as a default payment account. In another example, the receiver's preference may instruct the intelligent messaging server 204 to select different default accounts for different payment transactions based on the type of payment transaction, the initiator, the payment amount, and so on. That is, the receiver 116. For example, account_1 is to be selected as default payment account for a transaction with initiator X, account_2 is to be selected as default payment account for a transaction with initiator Y, account_3 is to be selected as default payment account for an ACH payment transaction, account_4 is to be selected as default payment account for transactions above $200, etc.

In another example embodiment, the intelligent messaging server may make the selection of the default payment account based on a preference of the financial entity associated with the initiator's payment account. Similar to the preference of the receiver, said preference of the financial entity may be provided during an initial set-up/registration process. For example, an initiator 114 may be transferring funds from the initiator's financial institution A payment account to the receiver 116. In said example, the receiver 116 has multiple accounts, one with financial institution A and another with financial institution C. Further, in said example, the initiator's bank, i.e., financial institution A may prefer the payment to be transferred to the receiver's financial institution A account to promote usage of the financial institution A payment services.

One of ordinary skill in the art can understand and appreciate that the above-mentioned examples are not limiting, and that any other appropriate preferences, such as initiator's preference, receiver bank's preference, etc., may be used to select the default payment account from a list of multiple payment accounts without departing from a broader scope of the present disclosure.

In either case, responsive to identifying and selecting one of the multiple payment accounts as the default payment account, the intelligent messaging server 204 may retrieve, from the routing table, the directory database location information of the directory that includes payment account information of the selected default payment account. Responsively, in operation 804, the intelligent messaging server 204 may generate and transmit a payment account information query to the directory (108*a-c*) that includes payment account information of the selected default payment account in order to retrieve the payment account information of the default payment account. Responsive to receiving the payment account information of the default payment account, in operation 806, the intelligent messaging server 204 may generate a payment request record that includes at least the payment account number associated with the selected default payment account of the receiver, the payment account number of the initiator's payment account, and the payment amount.

Even though FIG. 8 illustrates that the default payment account is selected before retrieving the payment account information of the default payment account, one of ordinary skill in the art can understand that in some example embodiments, the default payment account may be selected after the payment account information associated with each of the multiple payment accounts have be retrieved from the respective directories 108*a-c*.

In another example embodiment, provided that the payment request record that includes the default payment account identifier has not been transmitted to the payment network 122 (e.g., the initiator bank 112 or the clearing bank 118), the confirmation message that is sent to the receiver 116 may include an option that allows the receiver 116 to override the default payment account selected by the intelligent messaging server 204. If the receiver 116 opts to override the selection of the default payment account by the intelligent messaging server 204, then, the intelligent messaging server 204 may generate and transmit an electronic selection message to the receiver 116 as described above in FIG. 6. The electronic selection message may allow the receiver 116 to select a payment account from the multiple payment accounts to which the receiver 116 wants to receive a payment amount from the initiator 114. Alternatively, instead of sending the confirmation message and the electronic selection message as separate messages, the intelligent messaging server 204 may embed the electronic selection message within the confirmation message. That is, the confirmation message may include a list of the multiple payment accounts (e.g., their respective aliases) and an option to select one or more of the multiple payment accounts if the receiver 116 wants to override the default payment account selection by the intelligent messaging server 204.

iii. Receiver Lookup Operation

Turning to FIG. 7, this figure is a flow chat that illustrates a receiver lookup operation of the intelligent messaging system, in accordance with certain example embodiments of the present disclosure. In particular, the operations 602-624 illustrated in FIGS. 7A-7C are substantially similar to the operations 602-624 illustrated in FIG. 6. Accordingly, the operations 602-624 of FIGS. 7A-7C will not be described herein to avoid repetition and for the sake of brevity.

Responsive to successfully authentication the initiator and presenting the intelligent messaging services menu to the initiator, in operation 702, the initiator computing device 104 may determine that the initiator 114 has selected an option to perform a receiver lookup operation. In certain example embodiments, an initiator 114 may use the receiver lookup operation to obtain additional information associated with a receiver, such as a contact information associated with the receiver, unique identifier of the receiver, etc. For example, an initiator may have all the required information to initiate a payment transfer to a business entity (receiver) via the intelligent messaging server, but may want to obtain information regarding an individual within the business entity whom the user can call to confirm a payment amount or call to verify an invoice. Alternatively, the initiator may want to receive a physical address (location) of the business entity, or obtain information regarding the subsidiary entities of the business entity to specify certain information within the payment request (e.g., to input in a space provided for additional message in the payment request form). In another example, may have some information regarding the receiver, but not enough information to initiate a payment transfer via the intelligent messaging server. That is, in said example, the initiator may have a name and/or location of a receiver, but may not have the unique identifier of the receiver as requested in the payment request form. Accordingly, the initiator 114 may use the receiver lookup function to obtain said additional information.

Responsive to determining that the initiator 114 has selected the option to perform a receiver lookup, in operation 704, the initiator computing device 104 may operate in concert with the intelligent messaging system 102 to present (e.g., display) a web page with a search field to the initiator 114 and prompt the initiator 114 to input a search string associated with the receiver 116. Once the initiator 114 inputs a search string, in operations 706-708, the mobile application server 202 may receive the search string from the initiator computing device 104 and transmit it to the intelligent messaging server 204.

Responsive to receiving the search string, in operations 710-712, the intelligent messaging server 204 may query the routing table and/or the directories 108*a-c* to identify one or more receivers whose information matches and/or closely relates to the search string. In one example, if the search string includes the receiver identifier and the receiver is a registered user, the intelligent messaging server 204 may only have to search directories that specifically include information regarding the receiver as identified in the routing table. However, if the receiver is a not registered with the intelligent messaging server and/or if the search string is not a receiver identifier, the intelligent messaging server has to broadcast the receiver lookup query to all the directories 108a-c that are communicatively coupled to the intelligent messaging server 204. That is, the intelligent messaging server 204 may have to crawl through each directory and request the respective directory to search data entries of each receiver to identify receiver(s) whose data entries match or closely relate to the search string.

Upon identifying one or more receivers whose information (data entries in the directories) match or closely relate to the search string, in operation 714, the intelligent messaging server 204 may transmit a list of the one of more identified receivers to the initiator computing device 104. In operation 716, the initiator computing device 104 receives and presents the list of receivers to the initiator 114. Further, in operation 718, the initiator computing device 104 may prompt the initiator 114 to select one receiver that is of interest to the initiator 114. Responsive to the initiator 114 selecting a receiver from the list of receivers, in operation 720, the initiator computing device 104 receives and transmits the initiator's selection to the intelligent messaging server 204.

Upon receiving initiator's selection and identifying the receiver selected by the initiator 114, in operation 724, the intelligent messaging server 204 may query the routing table and/or the directories 108a-c to retrieve additional payment and/or non-payment related information associated with the selected receiver. Further, in operation 726, the intelligent messaging server 204 may retrieve, from the routing table database 424, privileges data associated with the initiator 114. As described above, the privileges data may indicate the registration status, privileges, and rights of the initiator 114. Responsively, in operation 726, based on the registration status, privileges, and rights of the initiator 114, the intelligent messaging server may transmit at least a portion of the additional information to the initiator computing device 104. That is, the granularity (e.g., type, amount, etc.) of the additional information sent to the initiator computing device 104 may vary based on the registration status, privileges, and rights of the initiator 114.

In operations 728-730, the initiator computing device 104 may receive at least a portion of the additional information from the intelligent messaging server 204 and present the received portion of the additional information to the initiator 114. Responsively, the receiver lookup operation ends.

In particular, the search associated with the receiver lookup operation may be substantially similar to a Google-like search where initially search results that match or relate to the search string are presented to a user and subsequently the user selects the a specific search result to obtain additional information. However, in some other embodiments, any other type of search algorithm may be used by the intelligent messaging server without departing from a broader scope of the present disclosure.

As described above, in one example environment where the intelligent messaging system of the present disclosure may be used is a transaction-focused field, where the first user is a payer, the first computing device is a payer computing device, the second user is a payee, the second computing device is a payee computing device, and the electronic session is an electronic payment transaction. For example, the intelligent messaging system may be used by a payer to initiate electronic payment transactions with a payee. In particular, the intelligent messaging server may receive an electronic payment transaction request from the payer computing device. The electronic payment transaction request includes a payment amount and a unique identifier of the payee (herein 'payee identifier'). The intelligent messaging server may compare the payee identifier against a routing table to determine if the payee is a registered user, i.e., whether the payee identifier is present in the routing table. Upon determining that the payee is an unregistered user, the intelligent messaging server generates and transmits an electronic registration message to the payee using the payee's identifier, where the electronic registration message is accessed through the payee computing device. The electronic registration message prompts the payee to provide temporary registration information required for temporary registration of the payee with the intelligent messaging server. Responsive to receiving the temporary registration information of the payee, the intelligent messaging system may store the temporary registration information in the temporary registration database that is distinct from the directory databases that include payment account information of one or more financial entity's customers. Further, the intelligent messaging server generates a payment request record comprising at least a payment identifier (e.g., payment account number') of the payer's payment account, the payment account identifier of the payee's payment account provided in the temporary registration information, and the payment amount.

Once the payment request record is generated, the intelligent messaging server may generate and transmit confirmation messages to the payer and/or the payee indicating successful creation of the payment request record. Furthermore, the intelligent messaging server may transmit the payment request record to a payment network (either periodically or as batch data) that is configured to clear and settle the payment request from the payer to the payee. One of ordinary skill in the art can understand and appreciate that the electronic payment transaction facilitated by the intelligent messaging system does not include clearing and settling the payment transaction. That is, the actual transfer of funds is not handled by the intelligent messaging system, instead, the actual transfer of funds is handled by a payment network system that is separate and distinct from the intelligent messaging server.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. An intelligent messaging communications system comprising:
a first computing device associated with a first user and configured to generate and transmit an electronic request comprising a task value and a unique identifier of a second user;
a second computing device associated with a second user;
an intelligent messaging server coupled to the first computing device, the second computing device, and a plurality of directory databases via a computing network, wherein each directory database includes account information associated with one or more accounts, and wherein the intelligent messaging server is configured to:
responsive to receiving the electronic request from the first computing device, generate a query to determine that the unique identifier of the second user is present in a routing table of the intelligent messaging server, wherein the routing table comprises a unique identifier of each registered user of the intelligent messaging server and location information of one or more of the plurality of directory databases that include account information of the registered user's accounts;
responsive to a negative determination that the unique identifier associated with the second user is present in the routing table, generate, using the unique identifier of the second user, an electronic registration message for transmission to the second computing device,
wherein the electronic registration message includes a hyperlink that directs the second user to a secure web document that prompts the second user to provide temporary registration information in order to temporarily register with the intelligent messaging server;
store the temporary registration information received from the second user computing device in a temporary registration database that is distinct from the plurality of directory databases,
wherein the temporary registration information includes at least an account identifier associated with an account of the second user, and wherein the temporary registration database maintains information associated with users that are registered to receive services offered by the intelligent messaging server for a temporary time period; and
generate a record comprising the task value, an account identifier associated with the first user, and the account identifier associated with the account of the second user.

2. The system of claim 1, wherein the temporary time period is a time associated with completing a current pending request.

3. The system of claim 1, wherein the temporary time period includes a one-time use of the services offered by the intelligent messaging server.

4. The system of claim 1, wherein the temporary time period includes a limited, but more than one-time use of the services offered by the intelligent messaging server.

5. The system of claim 1, wherein the temporary time period is determined by an entity associated with the account of the second user.

6. The system of claim 1, wherein the intelligent messaging server is configured to: generate a confirmation message for transmission to each of the first user and the second user informing the first user and the second user a successful creation of the record, respectively.

7. The system of claim 1, wherein the intelligent messaging server is configured to send a message to an entity associated with the second user informing the second user's entity that the second user has used services of the intelligent messaging server.

8. The system of claim 1, wherein the record is transmitted to a network, and wherein the network is configured to receive the request record and responsively, complete a task associated with the request record.

9. The system of claim 1, wherein the intelligent messaging server is configured to transmit the record to the network when one of a threshold number of records have been generated and a threshold time period has been met, wherein the record is a request record.

10. The system of claim 9, wherein the first user is a payer, wherein the second user is a payee, wherein the task value is a payment amount, and wherein each account is a payment account.

11. An intelligent messaging server that is communicatively coupled to a first computing device that is associated with a first user and configured to generate and transmit an electronic request comprising a unique identifier of a second user, a second computing device associated with the second user, and a plurality of directory databases via a computing network, wherein the intelligent messaging server comprises:
a routing table database that comprises a routing table that is generated prior to the electronic request, wherein the routing table comprises: a unique identifier of each registered user of the intelligent messaging server and location information of one or more directory databases that include account information of one or more accounts of the respective registered user;
a temporary registration engine that is coupled to the routing table database and configured to generate a query to determine that the unique identifier of the second user is present in the routing table of the intelligent messaging server; and
a message generation engine that is coupled to the temporary registration engine and configured to:
responsive to a negative determination that the unique identifier associated with the second user is present in the routing table, generate, using the unique identifier of the second user, an electronic registration message for transmission to the second user based on the second user's identifier,
wherein the electronic registration message includes a hyperlink that directs the second user to a secure web document comprising a temporary registration form;
responsive to the second user filling the temporary registration form, receive, from the second computing device, and store a temporary registration information obtained from the temporary registration form into a temporary registration database that is distinct from the plurality of directory databases, wherein the temporary registration information includes at least an account identifier associated with an account of the second user; and generate an electronic record comprising an account identifier associated with the first user's account, and the account identifier associated with the account of the second user.

12. The intelligent messaging server of claim 11, wherein the temporary registration database maintains information associated with users that are registered to receive services offered by the intelligent messaging server for a temporary time period.

13. The intelligent messaging server of claim 12, wherein the temporary time period is a time associated with completing a current pending request.

14. The intelligent messaging server of claim 12, wherein the temporary time period includes a one-time use of the services offered by the intelligent messaging server.

15. The intelligent messaging server of claim 12, wherein the temporary time period includes a limited, but more than one-time use of the services offered by the intelligent messaging server.

16. The intelligent messaging server of claim 12, wherein the temporary time period is determined by an entity associated with the account of the payee.

17. The intelligent messaging server of claim 11, wherein the intelligent messaging server is configured to: generate a confirmation message for transmission to each of the first user and the second user informing the first user and the second user a successful creation of the electronic record, respectively, wherein the first user is a payer, wherein the second user is a payee, and wherein the electronic request is an electronic payment request.

18. An intelligent messaging communications system comprising:
   a first computing device associated with a first user and configured to generate and transmit an electronic request comprising a unique identifier of a second user;
   a second computing device associated with a second user;
   an intelligent messaging server coupled to the first computing device, the second computing device, and a plurality of directory databases via a computing network, wherein each directory database includes account information associated with one or more accounts of one or more users, and wherein the intelligent messaging server is configured to:
   responsive to receiving the electronic request and a negative determination that second user is a registered user of the intelligent messaging server, generate, using the unique identifier of the second user, an electronic registration message for transmission to the second computing device,
      wherein the electronic registration message includes a hyperlink that directs the second user to a secure web document that prompts the second user to provide temporary registration information in order to temporarily register with the intelligent messaging server;
   store the temporary registration information received from the second computing device in a temporary registration database that is distinct from the plurality of directory databases,
      wherein the temporary registration information includes at least an account identifier associated with an account of the second user, and wherein the temporary registration database maintains information associated with users that are registered to receive services offered by the intelligent messaging server for a temporary time period; and
   generate an electronic record that comprises an account identifier associated with the first user's account, and the account identifier associated with the account of the second user.

19. The system of claim 18, wherein the intelligent messaging server is configured to generate a query to determine that the unique identifier of the second user is present in a routing table of the intelligent messaging server, wherein the routing table comprises a unique identifier of each registered user of the intelligent messaging server and location information of one or more of the plurality of directory databases that include account information of the registered user's accounts, and wherein the temporary time period includes a limited, but more than one-time use of the services offered by the intelligent messaging server.

20. The system of claim 18, wherein the temporary time period includes a one-time use of the services offered by the intelligent messaging server, wherein the first user is a payer, wherein the second user is a payee, and wherein the electronic request is an electronic payment transaction request.

21. An intelligent messaging communications system comprising:
   a first computing device associated with a first user and configured to generate and transmit an electronic request comprising a task value and a unique identifier of a second user;
   a second computing device associated with a second user;
   an intelligent messaging server coupled to the first computing device, the second computing device, and a plurality of directory databases via a computing network, wherein each directory database includes account information associated with one or more accounts, and wherein the intelligent messaging server is configured to:
   responsive to receiving the electronic request from the first computing device, generate a query to determine that the unique identifier of the second user is present in a routing table of the intelligent messaging server,
      wherein the routing table comprises a unique identifier of each registered user of the intelligent messaging server and location information of one or more of the plurality of directory databases that include account information of the registered user's accounts;
   responsive to a negative determination that the unique identifier associated with the second user is present in the routing table, generate, using the unique identifier of the second user, an electronic registration message for transmission to the second computing device,
      wherein the electronic registration message includes a hyperlink that directs the second user to a secure web document that prompts the second user to provide temporary registration information in order to temporarily register with the intelligent messaging server;
   store the temporary registration information received from the second user computing device in a temporary registration database that is distinct from the plurality of directory databases,
      wherein the temporary registration information includes at least an account identifier associated with an account of the second user, and wherein the temporary registration database maintains information associated with users that are registered to receive services offered by the intelligent messaging server for a temporary time period; and
generate a record comprising the task value, an account identifier associated with the first user, and the account identifier associated with the account of the second user, wherein the first user is a payer, wherein the second user is a payee,
wherein the task value is a payment amount, and wherein each account is a payment account.

22. An intelligent messaging server that is communicatively coupled to a first computing device that is associated with a first user and configured to generate and transmit an electronic request comprising a unique identifier of a second user, a second computing device associated with the second user, and a plurality of directory databases via a computing network, wherein the intelligent messaging server comprises:
a routing table database that comprises a routing table that is generated prior to the electronic request, wherein the routing table comprises: a unique identifier of each registered user of the intelligent messaging server and location information of one or more directory databases that include account information of one or more accounts of the respective registered user;
a temporary registration engine that is coupled to the routing table database and configured to generate a query to determine that the unique identifier of the second user is present in the routing table of the intelligent messaging server; and
a message generation engine that is coupled to the temporary registration engine and configured to:
responsive to a negative determination that the unique identifier associated with the second user is present in the routing table, generate, using the unique identifier of the second user, an electronic registration message for transmission to the second user based on the second user's identifier,
wherein the electronic registration message includes a hyperlink that directs the second user to a secure web document comprising a temporary registration form;
responsive to the second user filling the temporary registration form, receive, from the second computing device, and store a temporary registration information obtained from the temporary registration form into a temporary registration database that is distinct from the plurality of directory databases,
wherein the temporary registration information includes at least an account identifier associated with an account of the second user; and
generate an electronic record comprising an account identifier associated with the first user's account, and the account identifier associated with the account of the second user,
wherein the temporary registration database maintains information associated with users that are registered to receive services offered by the intelligent messaging server for a temporary time period, and
wherein the temporary time period is determined by an entity associated with the account of the payee.

23. An intelligent messaging communications system comprising:
a first computing device associated with a first user and configured to generate and transmit an electronic request comprising a unique identifier of a second user;
a second computing device associated with a second user;
an intelligent messaging server coupled to the first computing device, the second computing device, and a plurality of directory databases via a computing network, wherein each directory database includes account information associated with one or more accounts of one or more users, and wherein the intelligent messaging server is configured to:
responsive to receiving the electronic request and a negative determination that second user is a registered user of the intelligent messaging server, generate, using the unique identifier of the second user, an electronic registration message for transmission to the second computing device,
wherein the electronic registration message includes a hyperlink that directs the second user to a secure web document that prompts the second user to provide temporary registration information in order to temporarily register with the intelligent messaging server;
store the temporary registration information received from the second computing device in a temporary registration database that is distinct from the plurality of directory databases,
wherein the temporary registration information includes at least an account identifier associated with an account of the second user, and wherein the temporary registration database maintains information associated with users that are registered to receive services offered by the intelligent messaging server for a temporary time period; and
generate an electronic record that comprises an account identifier associated with the first user's account, and the account identifier associated with the account of the second user,
wherein the temporary time period includes a one-time use of the services offered by the intelligent messaging server, wherein the first user is a payer, wherein the second user is a payee, and wherein the electronic request is an electronic payment transaction request.

24. The system of claim 21, wherein the record is transmitted to a network, and wherein the network is configured to receive the request record and responsively, complete a task associated with the request record.

25. The system of claim 21, wherein the intelligent messaging server is configured to: generate a confirmation message for transmission to each of the first user and the second user informing the first user and the second user a successful creation of the record, respectively.

26. The intelligent messaging server of claim 22, wherein the temporary registration database maintains information associated with users that are registered to receive services offered by the intelligent messaging server for a temporary time period, and wherein the temporary time period includes a one-time use of the services offered by the intelligent messaging server.

27. The intelligent messaging server of claim 26, wherein the temporary time period includes a limited, but more than one-time use of the services offered by the intelligent messaging server.

28. The system of claim 23, wherein the intelligent messaging server is configured to generate a query to determine that the unique identifier of the second user is present in a table of the intelligent messaging server.

29. The system of claim 28, wherein the routing table comprises a unique identifier of each registered user of the intelligent messaging server and location information of one or more of the plurality of directory databases that include account information of the registered user's accounts, and wherein the temporary time period includes a limited, but more than one-time use of the services offered by the intelligent messaging server.

* * * * *